US011621593B2

(12) United States Patent
Inamori et al.

(10) Patent No.: US 11,621,593 B2
(45) Date of Patent: Apr. 4, 2023

(54) MAGNETIZING YOKE AND MANUFACTURING METHOD THEREOF

(71) Applicant: HONDA MOTOR CO., LTD., Tokyo (JP)

(72) Inventors: Kazunari Inamori, Tokyo (JP); Harufumi Takikawa, Tokyo (JP); Kenji Misao, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 17/384,964

(22) Filed: Jul. 26, 2021

(65) Prior Publication Data

US 2022/0037938 A1     Feb. 3, 2022

(30) Foreign Application Priority Data

Jul. 31, 2020   (JP) .............................. JP2020-130015

(51) Int. Cl.
*H02K 1/14* (2006.01)
*H02K 1/16* (2006.01)
*H02K 15/02* (2006.01)
*H02K 3/52* (2006.01)
*H02K 3/12* (2006.01)
*H02K 1/02* (2006.01)
*H02K 5/15* (2006.01)

(52) U.S. Cl.
CPC ............... *H02K 1/146* (2013.01); *H02K 1/02* (2013.01); *H02K 1/165* (2013.01); *H02K 3/12* (2013.01); *H02K 3/521* (2013.01); *H02K 5/15* (2013.01); *H02K 15/026* (2013.01)

(58) Field of Classification Search
CPC .......... H02K 1/165; H02K 3/345; H02K 3/38; H02K 3/487; H02K 5/15
See application file for complete search history.

(56) References Cited

U.S. PATENT DOCUMENTS

| | | | | |
|---|---|---|---|---|
| 2,975,309 | A | * | 3/1961 | Seidner .................. H02K 9/197 |
| | | | | 174/DIG. 20 |
| 2012/0274156 | A1 | * | 11/2012 | Chamberlin ............. H02K 1/16 |
| | | | | 310/58 |
| 2020/0007000 | A1 | * | 1/2020 | Berendes .................. H02K 1/16 |

FOREIGN PATENT DOCUMENTS

| | | | | |
|---|---|---|---|---|
| DE | 102012220684 A1 | * | 5/2014 | ............... H02K 1/12 |
| JP | 2014-096897 A | | 5/2014 | |

(Continued)

OTHER PUBLICATIONS

Franieck et al., May 2014, DE 102012220684 A1 machine translation (Year: 2014).*

(Continued)

*Primary Examiner* — Ahmed Elnakib
*Assistant Examiner* — Minki Chang
(74) *Attorney, Agent, or Firm* — Rankin, Hill & Clark LLP

(57) ABSTRACT

A magnetizing yoke prevents coils from being damaged and/or broken when an object to be magnetized is magnetized, more securely as compared with any conventional arts. The magnetizing yoke includes a slot member made of thermoplastic resin and formed with slots for inserting and fixing windings of an iron core, wherein the slot member is inserted into and fixed to the iron core. The magnetizing yoke is manufactured using a simple step of mounting the slot members made of resin on the iron core.

5 Claims, 14 Drawing Sheets

(56) References Cited

FOREIGN PATENT DOCUMENTS

| | | |
|---|---|---|
| JP | 6669626 B2 | 3/2020 |
| WO | 2020/017133 A1 | 1/2020 |

OTHER PUBLICATIONS

Office Action received in corresponding Japanese application No. 2020-130015 dated Apr. 26, 2022 with English translation (6 pages).

* cited by examiner

MAGNETIZING YOKE AND MANUFACTURING METHOD THEREOF

CROSS-REFERENCE TO RELATED APPLICATION

This application claims the benefit of priority to Japanese Patent Application No. 2020-130015 filed on 31 Jul. 2020, the disclosures of all of which are hereby incorporated by reference in their entireties.

TECHNICAL FIELD

The present invention relates to a magnetizing yoke and a manufacturing method thereof.

BACKGROUND OF THE INVENTION

A magnetizing yoke for magnetizing a rotor core for a motor has been known to have a thermosetting resin filled into spaces between teeth of an iron core, where coils (windings) are arranged, and a coil end section formed of a group of coils extending out of an end surface of the iron core (see Japanese Patent No. 6669626 B2 referred to as Patent Document 1 hereinbelow, for example). The thermosetting resin of the magnetizing yoke is made of flowable uncured thermosetting resin filled into the aforementioned spots and then heated for curing, to fix the coils with each other and the group of coils with the iron core. With such a magnetizing yoke, the cured resin prevents coils from being displaced, even though a relatively large alternate load is applied to the coils, when a rotor core is magnetized, due to a high electrical current applied to the coils at specified time intervals. This allows the magnetizing yoke to prevent breakdown between the coils and/or between the coils and the iron core.

SUMMARY OF THE INVENTION

Problems to be solved

In the meanwhile, it is difficult for a conventional magnetizing yoke (see Patent Document 1, for example) to completely eliminate air bubbles mixed into the thermosetting resin filled into the aforementioned spots, because the uncured thermosetting resin has viscosity. This causes the cured resin to have voids formed of engulfed air bubbles. However, voids formed in the resin arranged between the coils and/or between the cons and the iron core reduce strength to fix coils. In addition, voids reduce isolation properties of the resin so that the cons applied with a high electrical current likely have discharge. This may cause a conventional magnetizing yoke to have the coils damaged or broken due to such an alternate load and/or discharge.

The present invention is intended to provide a magnetizing yoke and a manufacturing method thereof to prevent coils from being damaged and/or broken when an object to be magnetized is magnetized, more securely as compared with any conventional arts.

Solution to Problem

A magnetizing yoke of the present invention, as a solution to the above-identified problem, includes a slot member made of thermoplastic resin and formed with slots for inserting and fixing windings of an iron core, wherein the slot member is inserted into and fixed to the iron core. In addition, a manufacturing method of a magnetizing yoke according to the present invention includes: a step of arranging through-holes in an iron core side by side in a circumferential direction about an axis of the iron core, so that the through-holes each extend along the axis; a step of forming slot members made of thermoplastic resin and each having slots for inserting and fixing windings of the iron core; a step of inserting the slot members into the respective through-holes; and a step of inserting the windings into the slots for fixing.

Advantageous Effects of the Invention

The magnetizing yoke and manufacturing method thereof according to the present invention prevent coils from being damaged and/or broken when an object to be magnetized is magnetized, more securely as compared with any conventional arts.

EMBODIMENTS OF THE INVENTION

Hereinafter, a description is given in details of a magnetizing yoke of an embodiment to implement the present invention. The magnetizing yoke of the present embodiment has windings of an iron core inserted into and fixed to a pre-molded slot member made of thermoplastic resin. In the present embodiment, a description is given of a twelve-pole magnetizing yoke to magnetize a rotor core of an electric motor as an object to be magnetized, as an example. However, the number of poles of the magnetizing yoke and the object to be magnetized are not limited thereto, as described below.

Figure 1:
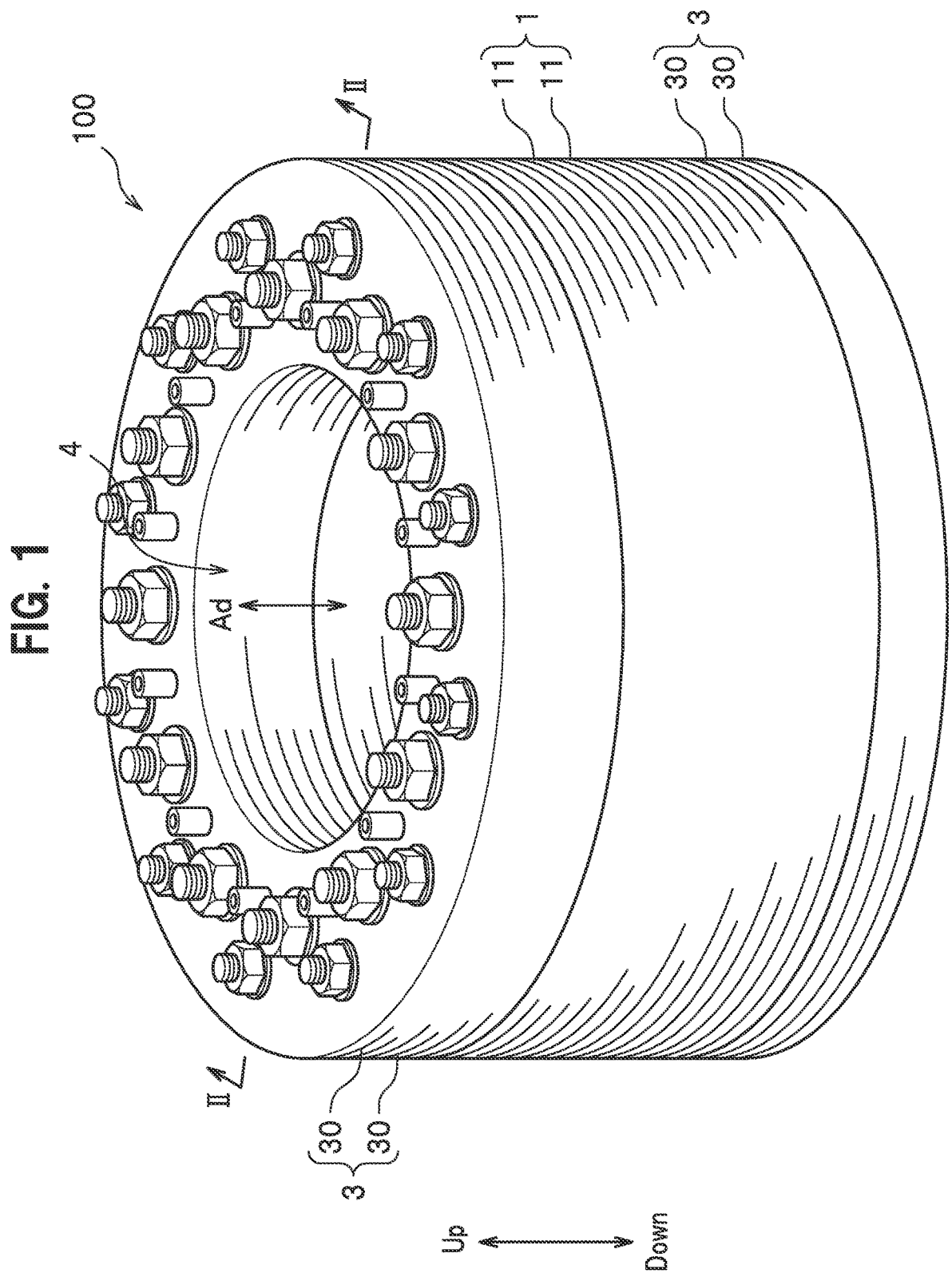
FIG. 1 is an overall perspective view of a magnetizing yoke according to an embodiment of the present invention.
Figure 2:
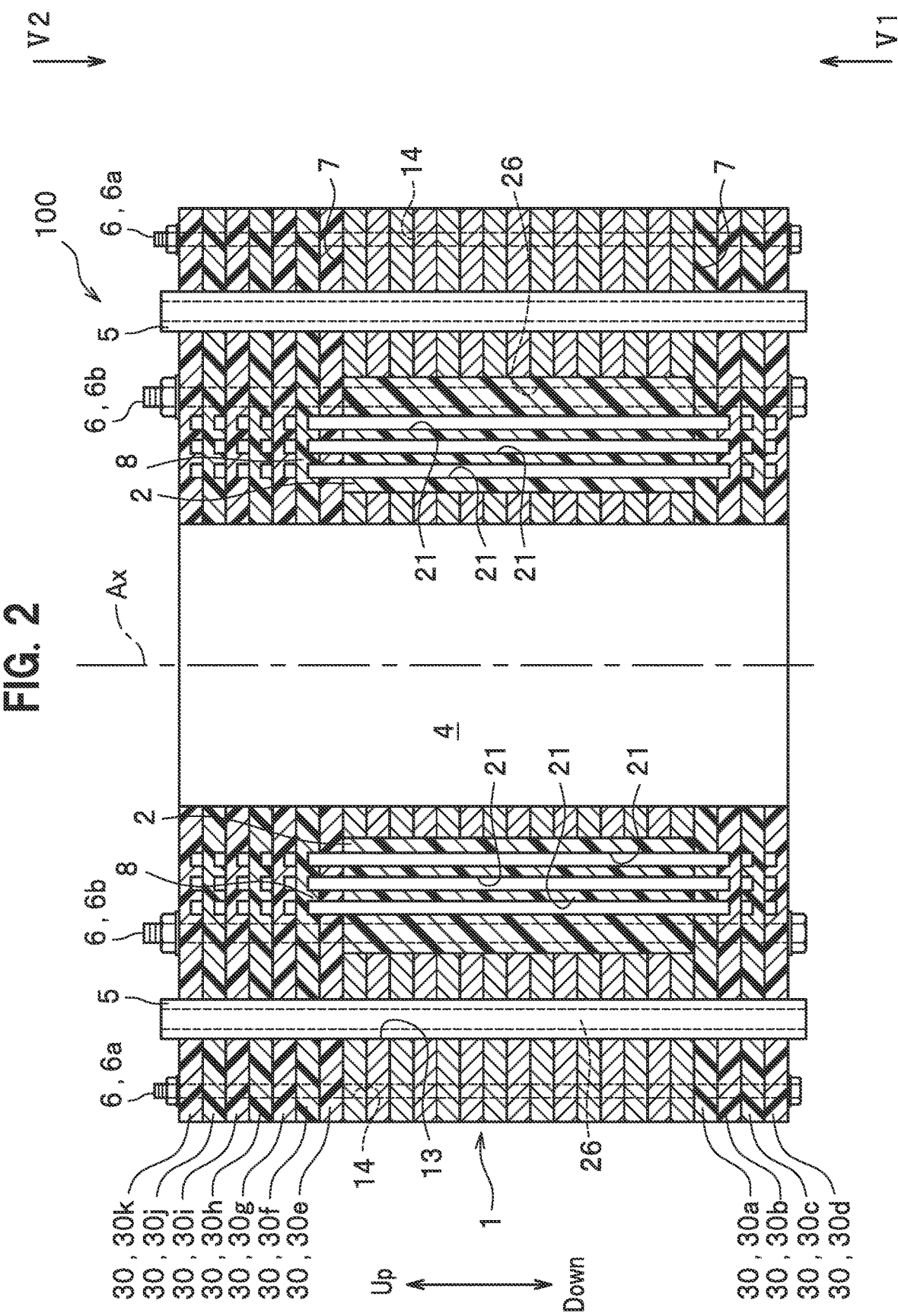
FIG. 2 is a schematic cross-sectional view, taken along a line II-II in FIG. 1.

FIG. 1 is an overall perspective view of a magnetizing yoke 100 according to the present embodiment. FIG. 2 is a schematic cross-sectional view, taken along a line II-II in FIG. 1. An up-down direction hereinbelow is identical to an up-down direction indicated by an arrowed line in FIG. 1.

The magnetizing yoke of the present embodiment is formed into a cylinder having a hollow 4 in a cylindrical shape on a radially inner side, as shown in FIG. 1. The hollow 4 of the magnetizing yoke 100 is a workpiece insertion hole into which an object to be magnetized (i.e., a rotor core), not shown, is placed. Incidentally, the object to be magnetized is placed so as to be coaxial with an axis Ax of the iron core (see FIG. 2) of the magnetizing yoke 100, to be described below, so that a peripheral surface of the object to be magnetized is magnetized.

The magnetizing yoke 100 includes an iron core 1 and end-face members 3 arranged on both end faces 7 of the iron core 1, as shown in FIG. 1. In addition, the magnetizing yoke 100 includes a slot member 2 for inserting and fixing windings 8 of the iron core 1, as shown in FIG. 2. Note that in FIG. 2, a reference sign 5 indicates a cooling pipe to cool the iron core 1, a reference sign 6 indicates a fastener to fasten the iron core 1 to the end-face members 3, and the reference sign Ax indicates the axis of the iron core.

<Iron Core>

The iron core 1 is described first. The iron core 1 constitutes a central portion in a height direction of the magnetizing yoke in a cylindrical shape, as shown in FIG. 1. That is, the iron core 1 partially forms an outer and inner peripheral surfaces of the magnetizing yoke 100 at the center in the height direction of the magnetizing yoke 100.

Figure 3:
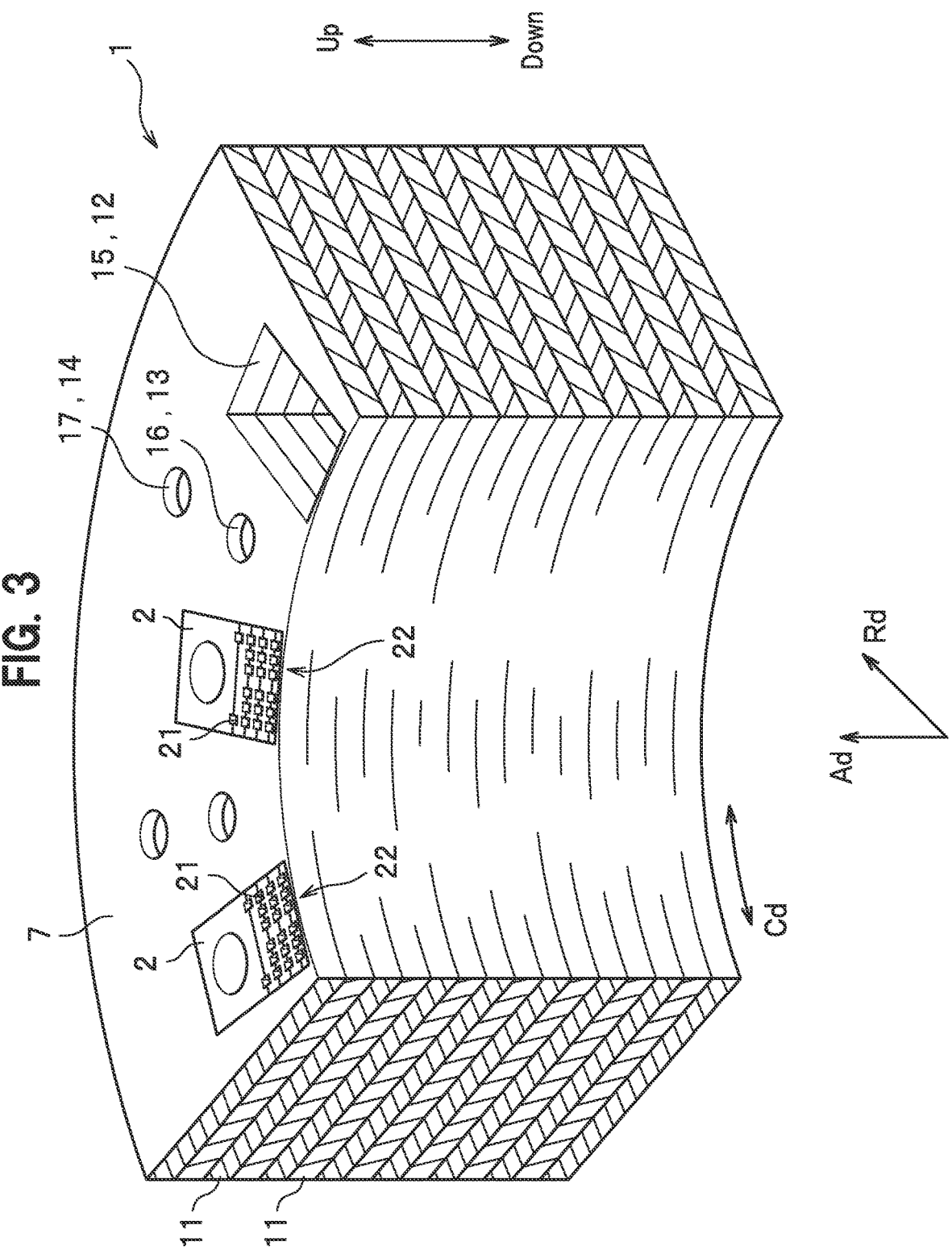
FIG. 3 is a partial enlarged perspective view of an iron core attached with slot members.

FIG. 3 is a partial enlarged perspective view of the iron core 1, partially including cut-off cross sections, to partially show substantially a quarter in a circumferential direction of the iron core 1. Note that the reference sign 2 in FIG. 3 indicates the slot member to be described below. Additionally in FIG. 3, an arrowed direction Cd indicates a circumferential direction of the iron core 1 (see FIG. 3), an arrowed direction Rd indicates a radial direction of the iron core 1 (see FIG. 3), and an arrowed direction Ad indicates an axial direction of the iron core.

The iron core 1 is formed with a plurality of iron core plates 11 superimposed in the axial direction Ad of the iron core, as shown in FIG. 3. The iron core plate 11 has the same annular planar shape as a planar shape of the magnetizing yoke 100 (see FIG. 1), and is formed of an electromagnetic steel plate made of silicon steel, for example.

The iron core plates 11 are each formed with a first hole 15, a second hole 16, and a third hole 17. When the iron core plates 11 are superimposed to form the iron core 1, the first holes 15, second holes 16, and third holes 17 respectively form a through-hole 12, a through-hole 13, and a through-hole 14 that penetrate the iron core 1 in the axial direction Ad of the iron core.

The through-hole 12 opens on the end face 7 of the iron core 1 and the opening is in a rectangular shape, as shown in FIG. 3. The through-hole 12 is formed on the radially inner side of the iron core 1 such that one of two pairs of opposite sides in the rectangular shape of the opening is substantially in parallel to the radial direction Rd of the iron core 1 and the other of those is substantially in parallel to the circumferential direction Cd.

The through-holes 12 are formed on the radially inner side of the iron core 1 side by side at equal intervals in the circumferential direction Cd. That is, the three through-holes 12 are shown in FIG. 3, which covers a quarter of the iron core 1, and the twelve through-holes 12 are formed on the entire circumference side by side at equal intervals, although not shown. The through-holes 12 have the respective slot members 2 inserted thereinto and fixed therein. The through-hole 12 corresponds to a "through-hole" in one or more claims.

The through-hole 13 opens on the end face 7 of the iron core 1 and the opening is in a circular shape, as shown in FIG. 3. The through-holes 13 of the present embodiment are formed between the adjacent through-holes 12 and are arranged side by side in the circumferential direction Cd of the iron core 1. That is, the iron core 1 of the present embodiment has the twelve through-holes 13 formed side by side at equal intervals in the circumferential direction Cd. The through-holes 13 are each arranged on a radially outer side of the iron core 1 than a slot 21 of the slot member 2 to be described below. The through-holes 13 each have the cooling pipes 5 inserted thereinto and fixed therein, as shown in FIG. 2.

The through-hole 14 opens on the end face 7 of the iron core 1 and the opening is in a circular shape, as shown in FIG. 3. The through-holes 14 of the present embodiment are formed on an outer side in the radial direction Rd of the iron core 1 than the through-hole 13. That is, the iron core 1 of the present embodiment has the twelve through-holes 14 formed side by side at equal intervals in the circumferential direction Cd. The through-holes 14 are each arranged on an outer side in the radial direction Rd of the iron core 1 than the slot member 2 to be described below. The through-holes 14 each have a first fastener 6a (see FIG. 2) of the fastener 6 (see FIG. 2) inserted thereinto.

<Slot Member>

Figure 4A:
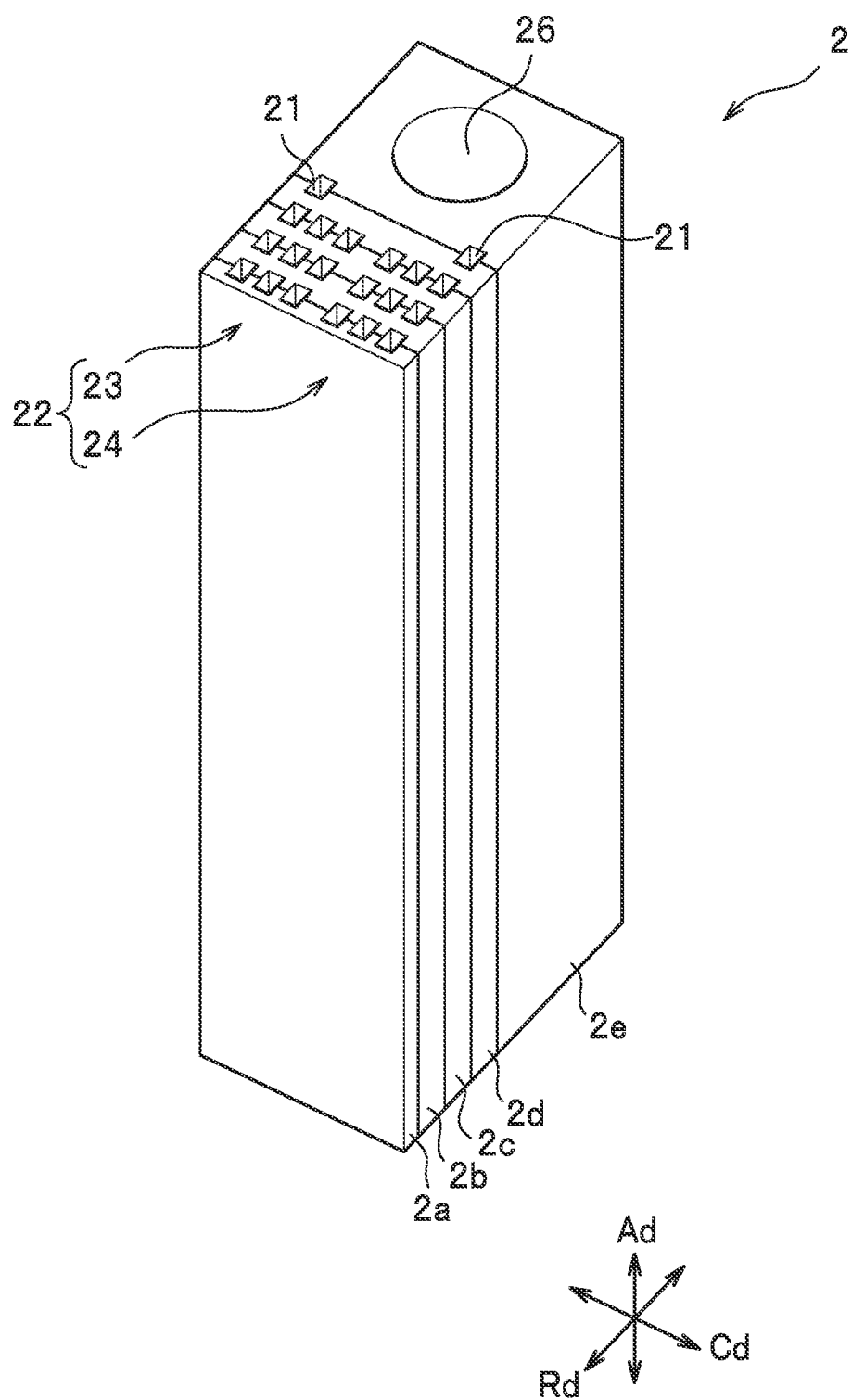
FIG. 4A is an overall perspective view of the slot member.
Figure 4B:
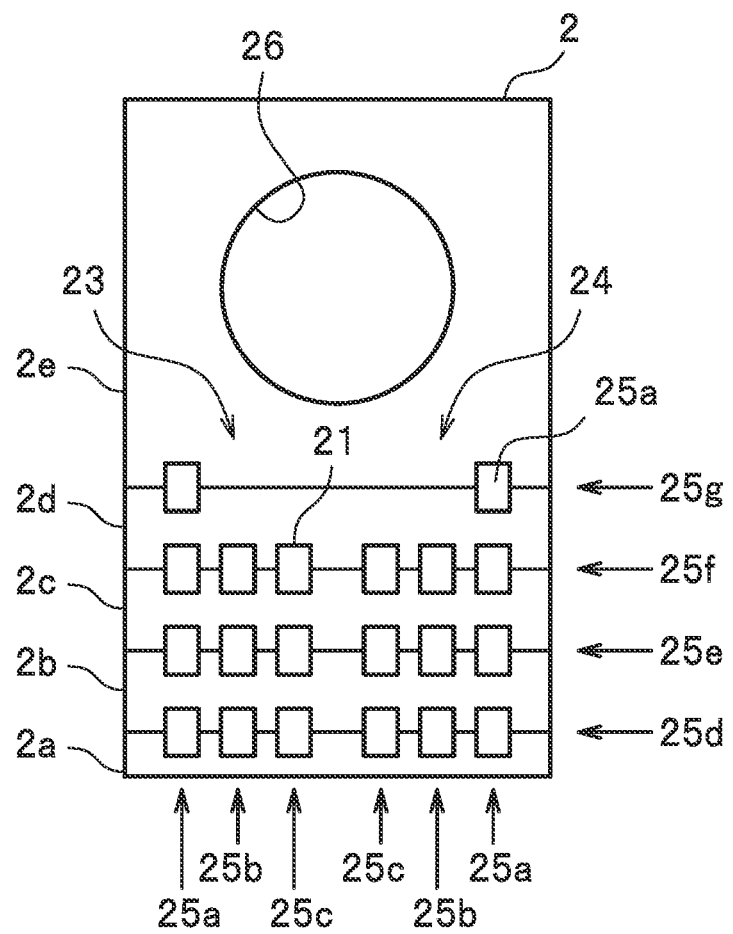
FIG. 4B is a plan view of the slot member.

Next, the slot member 2 is described. FIG. 4A is an overall perspective view of the slot member 2. In FIG. 4A, the arrowed direction Cd indicates a circumferential direction of the iron core 1 (see FIG. 3), the arrowed direction Rd indicates a radial direction of the iron core 1 (see FIG. 3), and the arrowed direction Ad indicates the axial direction of the iron core. FIG. 4B is a plan view of the slot member 2, as viewed along the arrowed direction Ad.

The slot member 2 has a part 2a, part 2b, part 2c, part 2d, and part 2e superimposed in the radial direction Rd of the iron core 1 (see FIG. 3), to have a square pillar shape, as shown in FIG. 4A. Specifically, the slot member 2 has an outer shape to be fitted into the through-hole 12 of the iron core 1 in FIG. 3.

The part 2a, part 2b, part 2c, part 2d, and part 2e are each formed with a half of the slot 21 so as to form the slot 21 at a predetermined position (to be described below), when superimposed in the radial direction Rd as described above. When the part 2a, part 2b, part 2c, part 2d, and part 2e face each other, halves of the slot 21 then abut each other to form the single slot 21.

Incidentally, the slot member 2 of the present embodiment has the part 2a, part 2b, part 2c, part 2d, and part 2e, each made of a plate, arranged in this order from an inner side of the radial direction Rd of the iron core 1 (see FIG. 3) outward, to have the part 2e in a square pillar shape, having a through-hole 26 (to be described below), located on the outermost side in the radial direction Rd.

The slot member 21 is formed with a slot group 22, collectively including the slots 21, on the inner side in the radial direction Rd of the iron core 1, as shown in FIG. 3. The slot 21 is formed of a through-hole, having a rectangular cross section, formed to penetrate the slot member 2 in the axial direction Ad of the iron core, although not shown. The slot 21 has the winding 8 (see FIG. 2) of the iron core 1 inserted thereinto and fixed therein, as will be described below in detail.

The slot group 22 of the slot member 2 are formed with the slots 21 arrayed in a matrix, as shown in FIG. 4A. The slot group 22 includes a first slot group 23 and a second slot group 24 which are symmetric with respect to a center in the circumferential direction Cd (i.e., a width direction) of the slot member 2.

As shown in FIG. 4B, the first slot group 23 and second slot group 24 are each formed with a first column 25$a$ having the four slots 21 aligned in the radial direction Rd, a second column 25$b$ having the three slots 21 aligned in the radial direction Rd, and a third column 25$c$ having the three slots 21 aligned in the radial direction Rd, totally with the ten slots 21, from an outer side in the circumferential direction Cd (i.e., the width direction) of the slot member 2 toward the center.

Note that such a geometry of the slots 21 defines a first row 25$d$, having the six slots 21 aligned in the circumferential direction Cd, on the innermost side in the radial direction Rd. Additionally, the geometry of the slots 21 defines: a second row 25$e$, having the six slots 21 in the circumferential direction Cd, on an outer side in the radial direction Rd of the first row 25$d$; a third row 25$f$, having the six slots 21 in the circumferential direction Cd, on an outer side in the radial direction Rd of the second row 25$e$; and a fourth row 25$g$, having the two slots 21 in the circumferential direction Cd, on an outer side in the radial direction Rd of the third row 25$f$.

As shown in FIG. 4A, the slot member 2 is formed, on an outer side in the radial direction Rd thereof, with the through-hole 26 having a circular cross section and penetrating the slot member 2 in the axial direction Ad of the iron core. The through-hole 26 has a second fastener 6$b$ (see FIG. 2), to be described below, of the fastener 6 (see FIG. 2) inserted thereinto.

The slot member 2 as described above is made of thermoplastic resin. Specifically, the slot member 2 of the present embodiment assumes that the part 2$a$, part 2$b$, part 2$c$, part 2$d$, and part 2$e$ are each formed by injection molding. Note that the part 2$a$, part 2$b$, part 2$c$, part 2$d$, and part 2$e$ may be integrally molded into a single-piece. The slot member 2 described above is obtained, for example, through a simple processing of forming the slots 21 (see FIG. 4A) and the through-hole 26 (see FIG. 4A) in a base material made of thermoplastic resin and having a square pillar shape, which has been formed by extrusion molding, by cutting or the like. The thermoplastic resin for forming the slot member 2 is preferably crystalline resin, such as polyetheretherketone (PEEK) and polyphenylene sulfide (PPS).

<End-face Member>

Next, the end-face member 3 (see FIG. a) is described. The end-face members 3 are arranged on both end-faces in the axial direction Ad of the iron core 1, as shown in FIG. 1. The end-face members 3 constitute an upper portion and lower portion in the height direction of the magnetizing yoke 100 in a cylindrical shape, and form an outer and inner peripheral surfaces of the magnetizing yoke 100, together with the iron core 1.

The end-face member 3 as described above is formed to have end-face plates 30 (see FIG. 1), each having the same annular planar shape as the magnetizing yoke 100 (see FIG. 1), superimposed in the axial direction Ad of the iron core. The end-face plates 30 include a first to fourth end-face plates 30$a$, 30$b$, 30$c$, 30$d$ arranged under the iron core 1 and a fifth to eleventh end-face plates 30$e$, 30$f$, 30$g$, 30$h$, 30$i$, 30$j$, 30$k$ arranged on the iron core 1, as shown in FIG. 2.

Figure 5A:
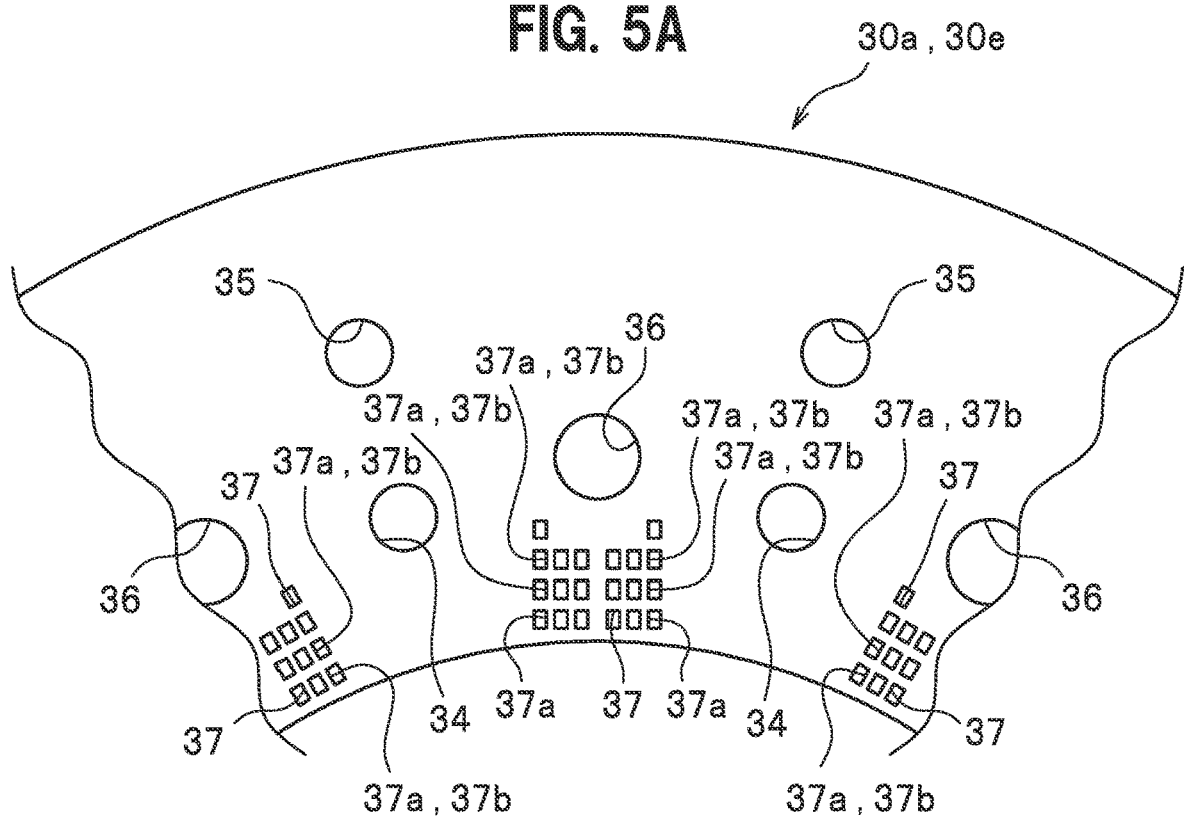
FIG. 5A is a partial enlarged plan view of a first end-face plate or a fifth end-face plate.
Figure 5B:
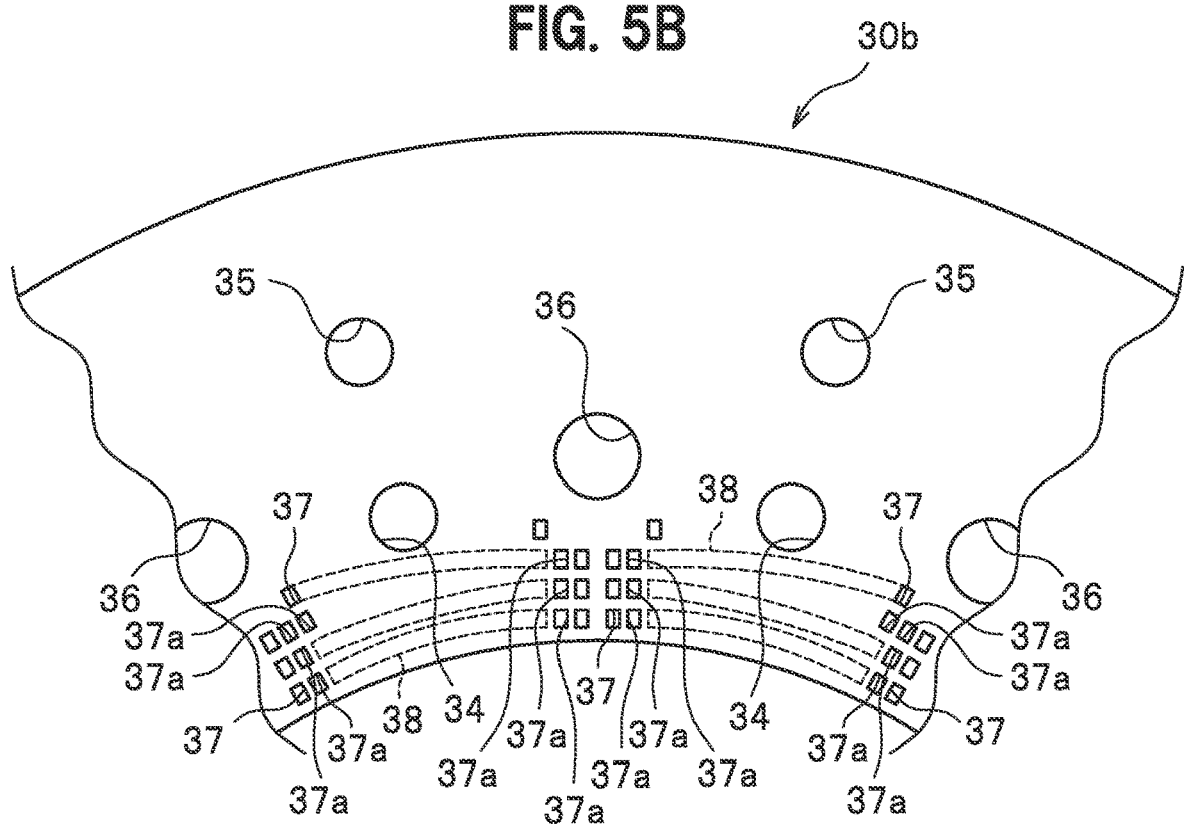
FIG. 5B is a partial enlarged plan view of a second end-face plate.
Figure 5C:
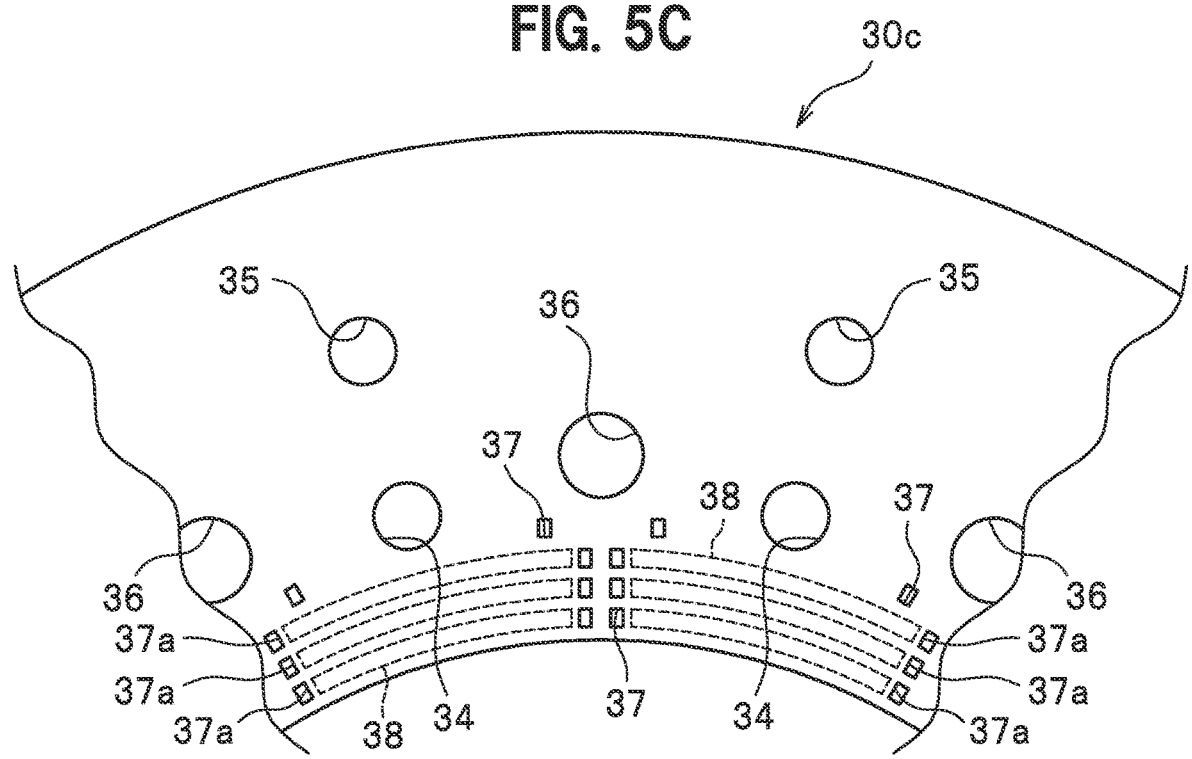
FIG. 5C is a partial enlarged plan view of a third end-face plate.
Figure 5D:
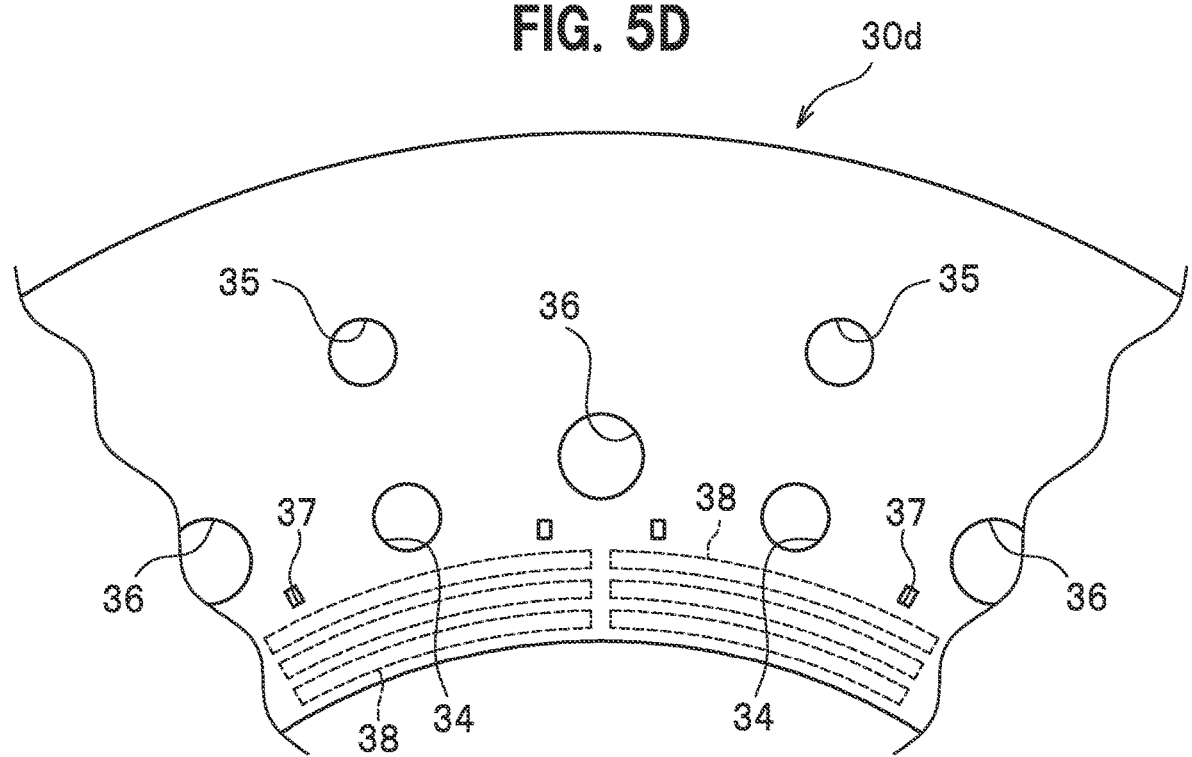
FIG. 5D is a partial enlarged plan view of a fourth end-face plate.
Figure 5E:
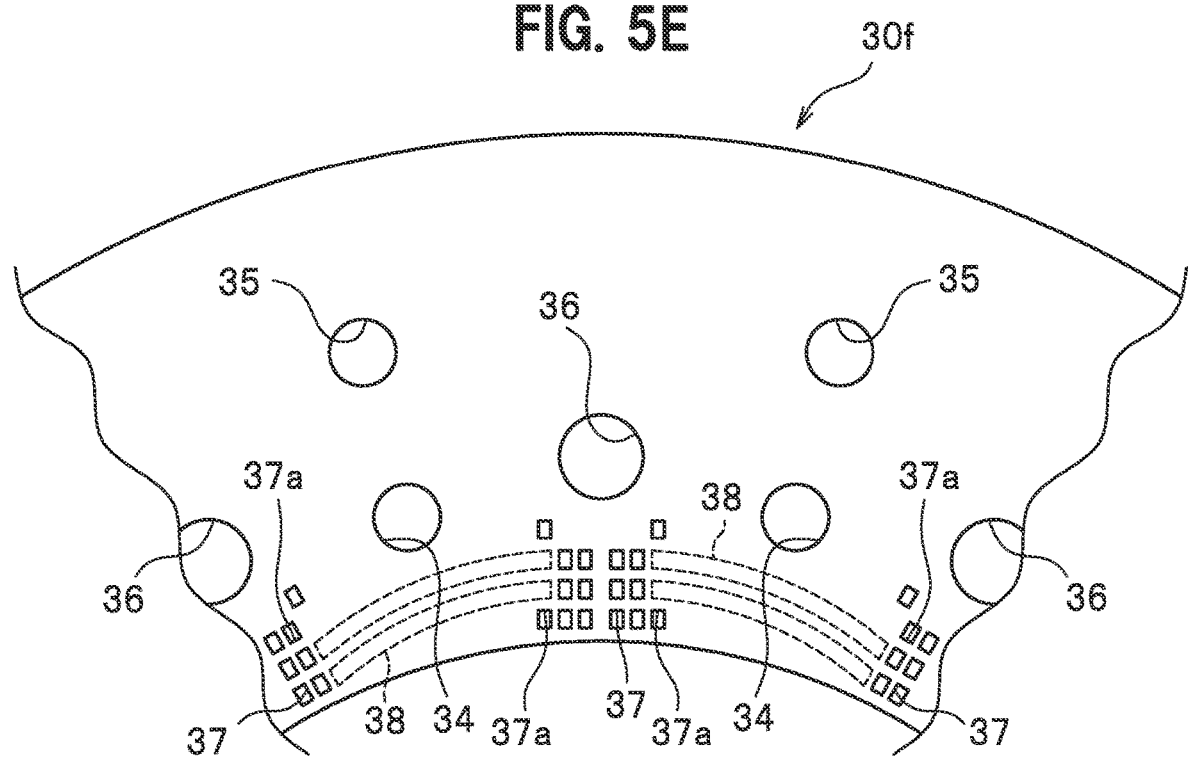
FIG. 5E is a partial enlarged plan view of a sixth end-face plate.
Figure 5F:
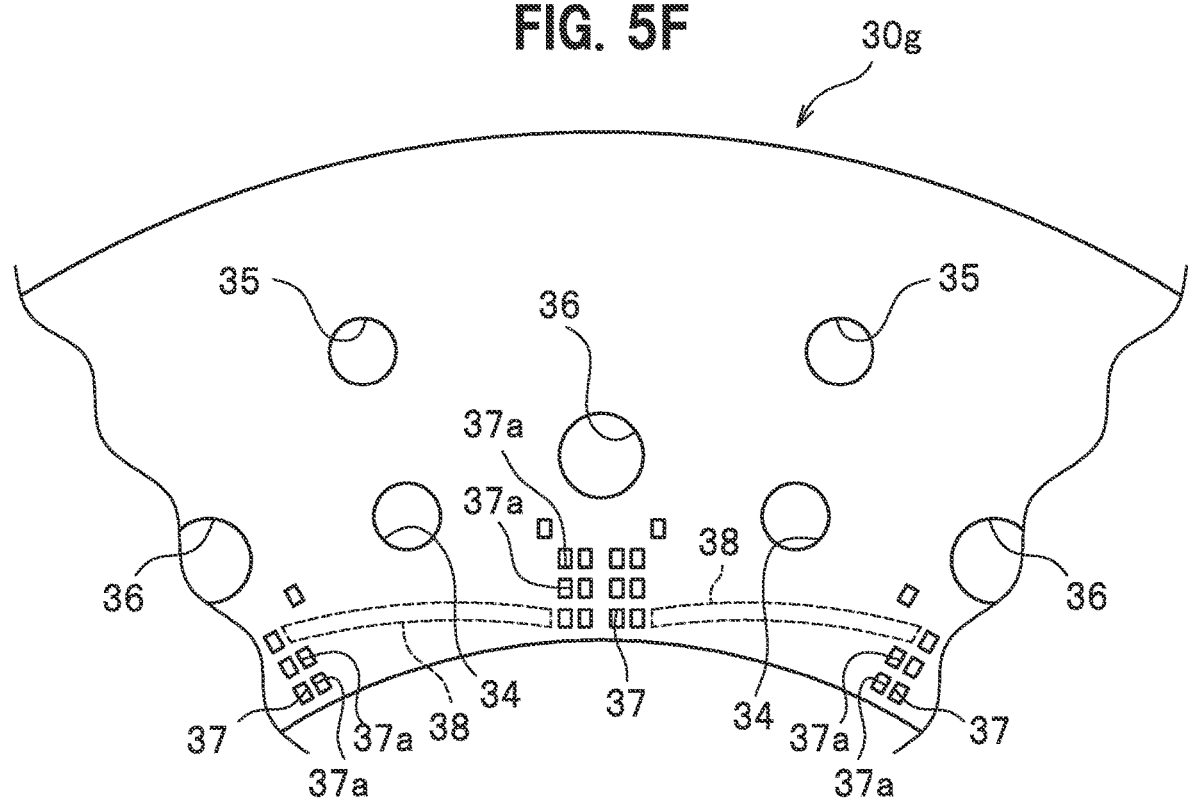
FIG. 5F is a partial enlarged plan view of a seventh end-face plate.
Figure 5G:
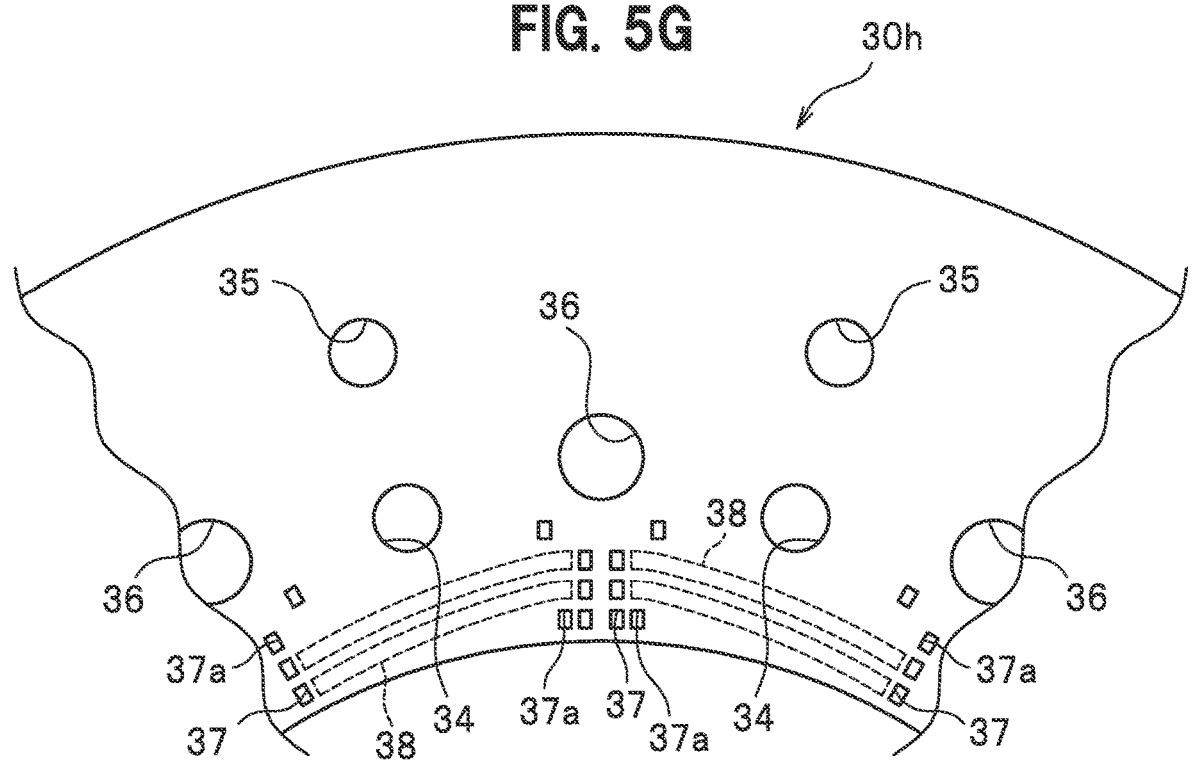
FIG. 5G is a partial enlarged plan view of an eighth end-face plate.
Figure 5H:
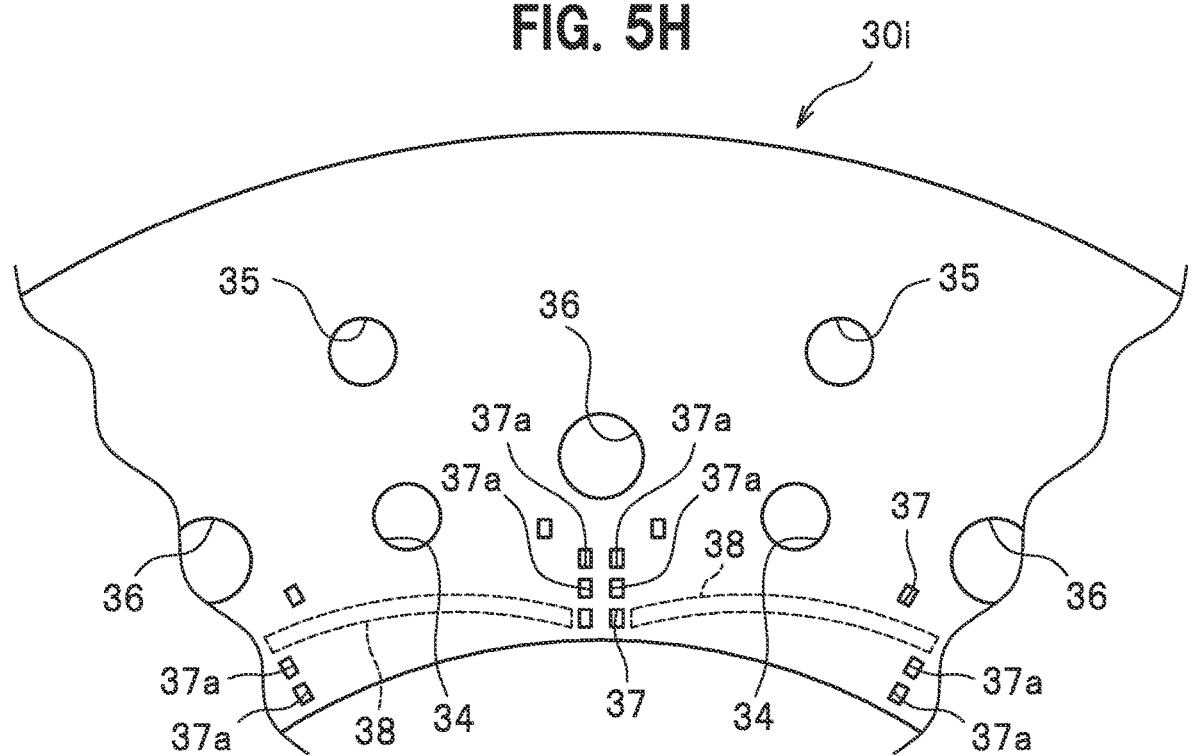
FIG. 5H is a partial enlarged plan view of a ninth end-face plate.
Figure 5I:
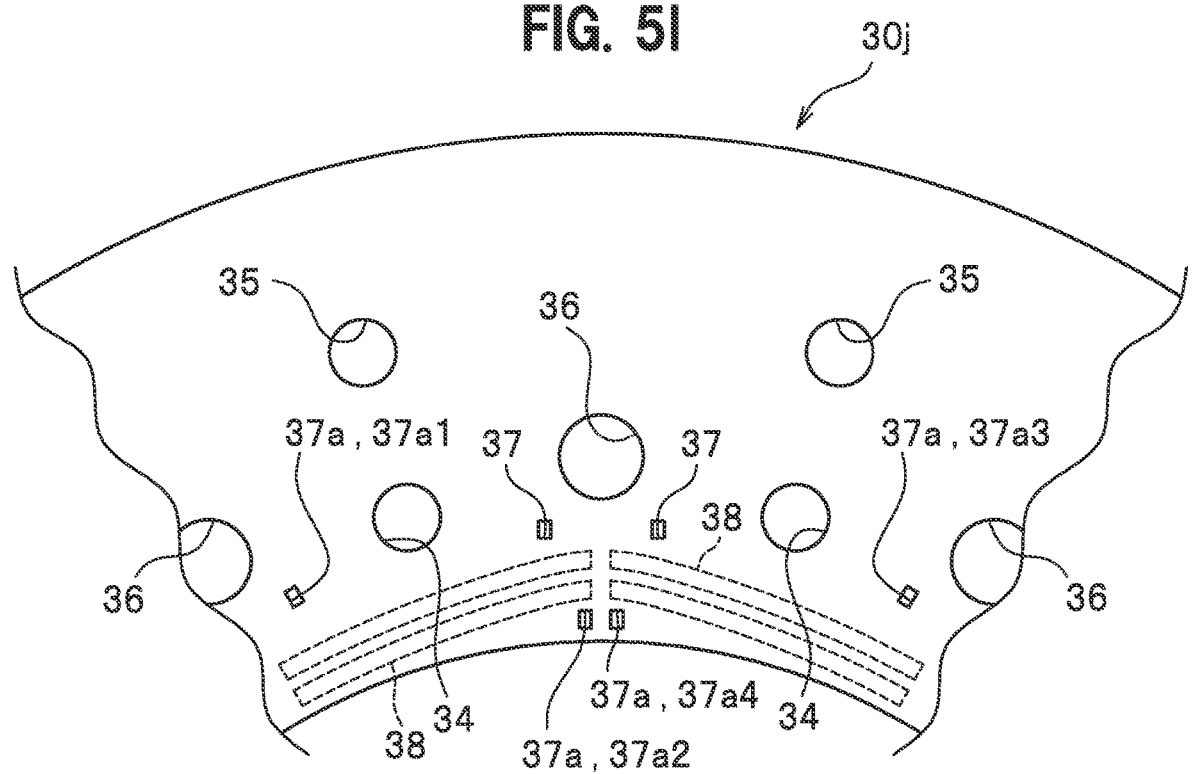
FIG. 5I is a partial enlarged plan view of a tenth end-face plate.
Figure 5J:
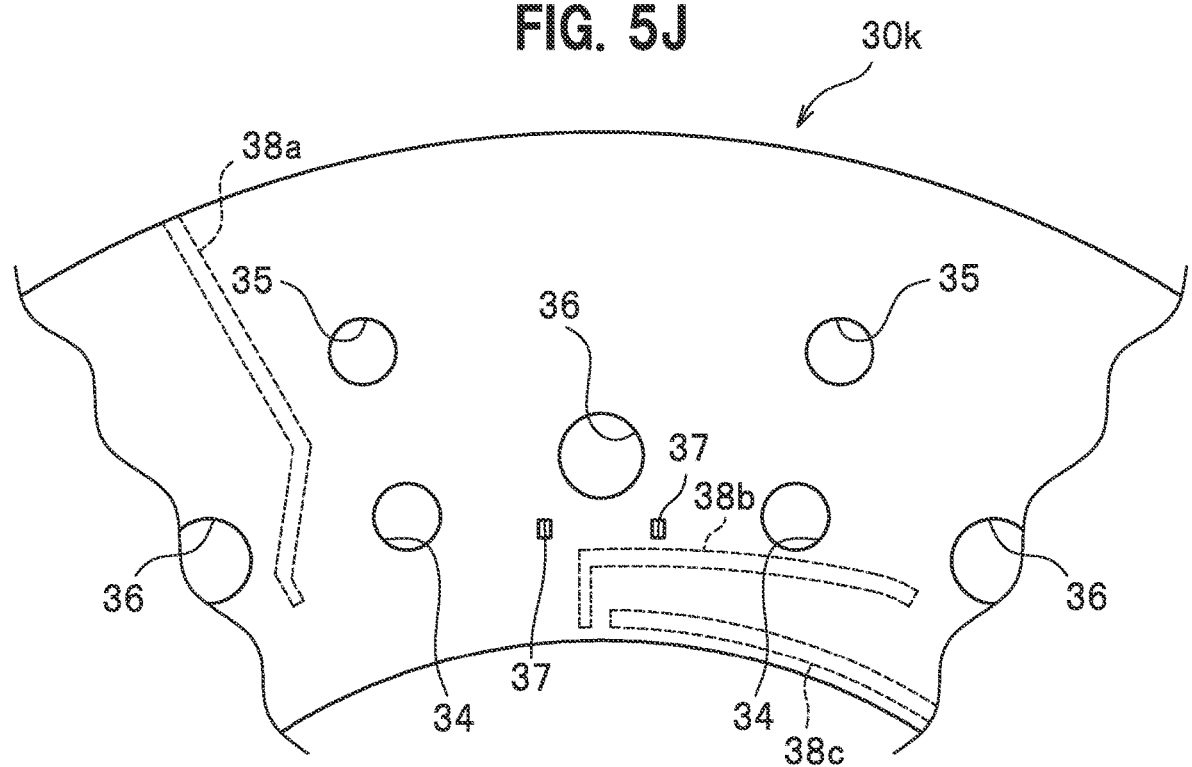
FIG. 5J is a partial enlarged plan view of an eleventh end-face plate.

FIG. 5A is a partial enlarged plan view of the first end-face plate 30$a$ or the fifth end-face plate 30$e$. FIG. 5B is a partial enlarged plan view of the second end-face plate 30$b$. FIG. 5C is a partial enlarged plan view of the third end-face plate 30$c$. FIG. 5D is a partial enlarged plan view of the fourth end-face plate 30$d$. FIG. 5E is a partial enlarged plan view of the sixth end-face plate 30$f$. FIG. 5F is a partial enlarged plan view of the seventh end-face plate 30$g$. FIG. 5G is a partial enlarged plan view of the eighth end-face plate 30$h$. FIG. 5H is a partial enlarged plan view of the ninth end-face plate 30$i$. FIG. 5I is a partial enlarged plan view of the tenth end-face plate 30$j$. FIG. 5J is a partial enlarged plan view of the eleventh end-face plate 30$k$.

Note that the first end-face plate 30$a$ in FIG. 5A, the second end-face plate 30$b$ in FIG. 5B, the third end-face plate 30$c$ in FIG. 5C, and the fourth end-face plate 30$d$ in FIG. 5D are the partial enlarged plan views as viewed from an arrowed direction V1 in FIG. 2. In contrast, the fifth end-face plate 30$e$ in FIG. 5A, the sixth end-face plate 30$f$ in FIG. 5E, the seventh end-face plate 30$g$ in FIG. 5F, the eighth end-face plate 30$h$ in FIG. 5G, the ninth end-face plate 30$i$ in FIG. 5H, the tenth end-face plate 30$j$ in FIG. 5I, and the eleventh end-face plate 30$k$ in FIG. 5J are the partial enlarged plan views as viewed from an arrowed direction V2 in FIG. 2.

<First to Fourth End-face Plates>

As shown in FIG. 2, the first end-face plate 30$a$ is arranged to be adjacent to the lower end face 7 of the iron core 1. As shown in FIG. 5A, the first end-face plate 30$a$ is formed with holes 34 corresponding to the through-holes 13 of the iron core 1 shown in FIG. 3, holes 35 corresponding to the through-holes 14 of the iron core 1 shown in FIG. 3, holes 36 corresponding to the through-holes 26 of the slot member 2 shown in FIG. 4A, and holes 37 corresponding to the slots 21 of the slot member 2 shown in FIG. 4A.

As shown in FIG. 2, the second end-face plate 30$b$ is arranged to be adjacent to a lower face of the first end-face plate 30$a$. As shown in FIG. 5B, the second end-face plate 30$b$ is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the second end-face plate 30$b$ is formed, on an upper side thereof (back side of the plane of paper in FIG. 5B), with grooves 38 extending along the planar direction of the second end-face plate 30$b$, as indicated by hidden outlines (dotted lines) in FIG. 5B. The grooves 38 are formed to correspond to the windings 8 (see FIG. 2) extending along a lower face of the first end-face plate 30$a$ (see FIG. 2), as will be described below.

Further, the second end-face plate 30$b$ is formed with the holes 37 so as to correspond to the holes 37 (see FIG. 5A) of the first end-face plate 30$a$ (see FIG. 5A), except holes 37$a$ (see FIG. 5A) of the first end-face plate 30$a$ (see FIG. 5A) to vertically overlap with both ends of the grooves 38 of the second end-face plate 30b. However, the second end-face plate 30b is exceptionally formed with the holes 37 to correspond to the slots 21 of the slot member 2 in FIG. 4B located at intersections of the first columns 25a and the fourth row 25g, although vertically overlapping with the ends of the grooves 38.

As shown in FIG. 2, the third end-face plate 30c is arranged to be adjacent to a lower face of the second end-face plate 30b. As shown in FIG. 5C, the third end-face plate 30c is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the third end-face plate 30c is formed, on an upper side thereof (back side of the plane of paper in FIG. 5C), with the grooves 38 extending along the planar direction of the third end-face plate 30c, as indicated by hidden outlines (dotted lines) in FIG. 5C. The grooves 38 are formed to correspond to the windings 8 (see FIG. 2) extending along an upper face of the second end-face plate 30b (see FIG. 2), as will be described below.

Further, the third end-face plate 30c is formed with the holes 37 so as to correspond to the holes 37 (see FIG. 5B) of the second end-face plate 30b (see FIG. 5B), except the holes 37a (see FIG. 5B) of the second end-face plate 30b (see FIG. 5B) to vertically overlap with both ends of the grooves 38 of the third end-face plate 30c.

As shown in FIG. 2, the fourth end-face plate 30d is arranged to be adjacent to a lower face of the third end-face plate 30c. As shown in FIG. 5D, the fourth end-face plate 30d is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the fourth end-face plate 30d is formed, on an upper side thereof (back side of the plane of paper in FIG. 5D), with the grooves 38 extending along the planar direction of the fourth end-face plate 30d, as indicated by hidden outlines (dotted lines) in FIG. 5D. The grooves 38 are formed to correspond to the windings 8 (see FIG. 2) extending along an upper face of the third end-face plate 30c (see FIG. 2), as will be described below.

Further, the fourth end-face plate 30d is formed with the holes 37 so as to correspond to the holes 37 (see FIG. 5C) of the third end-face plate 30c (see FIG. 5C), except the holes 37a (see FIG. 5C) of the third end-face plate 30c (see FIG. 5C) to vertically overlap with both ends of the grooves 38 of the fourth end-face plate 30d.

<Fifth to Eleventh End-face Plates>

As shown in FIG. 2, the fifth end-face plate 30e is arranged to be adjacent to the upper end face 7 of the iron core 1. As shown in FIG. 5A, the fifth end-face plate 30e has the same structure as the first end-face plate 30a. Then, detailed description of the fifth end-face plate 30e is omitted here.

As shown in FIG. 2, the sixth end-face plate 30f is arranged to be adjacent to an upper face of the fifth end-face plate 30e. As shown in FIG. 5E, the sixth end-face plate 30f is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the sixth end-face plate 30f is formed, on a lower side thereof (back side of the plane of paper in FIG. 5E), with the grooves 38 extending along the planar direction of the sixth end-face plate 30f, as indicated by hidden outlines (dotted lines) in FIG. 5E. The grooves 38 are formed to correspond to bridge lines 9 (see FIG. 7) extending along an upper face of the fifth end-face plate 30e (see FIG. 2), as will be described below. The sixth end-face plate 30f insulates the bridge lines 9 extending on the fifth end-face plate 30e from bridge lines (not shown) extending on the sixth end-face plate 30f so as to intersect the bridge lines 9.

Further, the sixth end-face plate 30f is formed with the holes 37 so as to correspond to the holes 37 (see FIG. 5A) of the fifth end-face plate 30e (see FIG. 5A), except holes 37b (see FIG. 5A) of the fifth end-face plate 30e (see FIG. 5A) to vertically overlap with both ends of the grooves 38 of the sixth end-face plate 30f.

As shown in FIG. 2, the seventh end-face plate 30g is arranged to be adjacent to an upper face of the sixth end-face plate 30f. As shown in FIG. 5F, the seventh end-face plate 30g is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the seventh end-face plate 30g is formed, on a lower side thereof (back side of the plane of paper in FIG. 5F), with the grooves 38 extending along the planar direction of the seventh end-face plate 30g, as indicated by hidden outlines (dotted lines) in FIG. 5F. The grooves 38 are formed to correspond to the bridge lines 9 (see FIG. 7) extending along an upper face of the sixth end-face plate 30f (see FIG. 2), as will be described below.

Further, the seventh end-face plate 30g is formed with the holes 37 so as to correspond to the holes 37 (see FIG. 5E) of the sixth end-face plate 30f (see FIG. 5E), except holes 37a (see FIG. 5E) of the sixth end-face plate 30f (see FIG. 5E) to vertically overlap with both ends of the grooves 38 of the seventh end-face plate 30g.

As shown in FIG. 2, the eighth end-face plate 30h is arranged to be adjacent to an upper face of the seventh end-face plate 30g. As shown in FIG. 5G, the eighth end-face plate 30h is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the eighth end-face plate 30h is formed, on a lower side thereof (back side of the plane of paper in FIG. 5G), with the grooves 38 extending along the planar direction of the eighth end-face plate 30h, as indicated by hidden outlines (dotted lines) in FIG. 5G. The grooves 38 are formed to correspond to the bridge lines 9 (see FIG. 7) extending along an upper face of the seventh end-face plate 30g (see FIG. 2), as will be described below.

Further, the eighth end-face plate 30h is formed with the holes 37 so as to correspond to the holes 37 (see FIG. 5F) of the seventh end-face plate 30g (see FIG. 5F), except holes 37a (see FIG. 5F) of the seventh end-face plate 30g (see FIG. 5F) to vertically overlap with both ends of the grooves 38 of the eighth end-face plate 30h.

As shown in FIG. 2, the ninth end-face plate 30i is arranged to be adjacent to an upper face of the eighth end-face plate 30h. As shown in FIG. 5H, the ninth end-face plate 30i is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the ninth end-face plate 30i is formed, on a lower side thereof (back side of the plane of paper in FIG. 5H), with the grooves 38 extending along the planar direction of the ninth end-face plate 30i, as indicated by hidden outlines (dotted lines) in FIG. 5H. The grooves 38 are formed to correspond to the bridge lines 9 (see FIG. 7) extending along an upper face of the eighth end-face plate 30h (see FIG. 2), as will be described below.

Further, the ninth end-face plate 30i is formed with the holes 37 so as to correspond to the holes 37 (see FIG. 5G) of the eighth end-face plate 30h (see FIG. 5G), except holes 37a (see FIG. 5G) of the eighth end-face plate 30h (see FIG. 5G) to vertically overlap with both ends of the grooves 38 of the ninth end-face plate 30i.

As shown in FIG. 2, the tenth end-face plate 30j is arranged to be adjacent to an upper face of the ninth end-face plate 30i. As shown in FIG. 5I, the tenth end-face plate 30j is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the tenth end-face plate 30j is formed, on a lower side thereof (back side of the plane of paper in FIG. 5I), with the grooves 38 extending along the planar direction of the tenth end-face plate 30j, as indicated by hidden outlines (dotted lines) in FIG. 5I. The grooves 38 are formed to correspond to the bridge lines 9 (see FIG. 7) extending along an upper face of the ninth end-face plate 30i (see FIG. 2), as will be described below.

Further, the tenth end-face plate 30j is formed with the holes 37 so as to correspond to the holes 37 (see FIG. 5H) of the ninth end-face plate 30i (see FIG. 5H), except holes 37a (see FIG. 5H) of the ninth end-face plate 30i (see FIG. 5H) to vertically overlap with both ends of the grooves 38 of the tenth end-face plate 30j.

As shown in FIG. 2, the eleventh end-face plate 30k is arranged to be adjacent to an upper face of the tenth end-face plate 30j. As shown in FIG. 5J, the eleventh end-face plate 30k is formed with the holes 34 corresponding to the through-holes 13 of the iron core 1 shown in FIG. 3, the holes 35 corresponding to the through-holes 14 of the iron core 1 shown in FIG. 3, and the holes 36 corresponding to the through-holes 26 of the slot member 2 shown in FIG. 4A.

In addition, the eleventh end-face plate 30k is formed, on a lower side thereof (back side of the plane of paper in FIG. 5J), with grooves 38a, 38b, 38c extending along the planar direction of the eleventh end-face plate 30k, as indicated by hidden outlines (dotted lines) in FIG. 5J. The grooves 38a, 38b, 38c are formed to correspond to lead lines (not shown and to be described below) extending along an upper face of the ninth end-face plate 30i (see FIG. 2), as will be described below. Further, the eleventh end-face plate 30k is formed with the holes 37 to correspond to only the slots 21 of the slot member 2 in FIG. 4B at intersections of the first columns 25a and the fourth row 25g.

The holes 37 to have the windings 8 inserted thereinto and grooves 38 of the end-face plates 30 (see FIG. 2) as described above correspond to "winding supporters to support the windings" in one or more claims. The "winding supporters to support the windings" are described in detail below, together with a manufacturing method of the magnetizing yoke.

Note that the end-face plate plates 30 (see FIG. 2) are assumed to be formed of thermoplastic resin. The thermoplastic resin is preferably a crystalline resin, such as polyetheretherketone (PEEK) and polyphenylene sulfide (PPS), as with the slot member 2.

<Manufacturing Method of Magnetizing Yoke>

Next, a manufacturing method of the magnetizing yoke 100 (see FIG. 1) is described. First in this manufacturing method, the iron core plates 11 (see FIG. 3), the slot members 2 (see FIG. 4A), and the end-face plates 30 (see FIG. 2) are prepared. Next in the manufacturing method, the iron core plates 11 are superimposed to form the iron core 1 having the through-holes 12, through-holes 13, and through-holes 14, as shown in FIG. 3. Incidentally, the through-hole 12 corresponds to the "through-hole" in one or more claims, as described above. A step of superimposing the iron core plates 11 to form the iron core 1 corresponds to "a step of arranging through-holes in an iron core side by side in a circumferential direction about an axis of the iron core, such that the through-holes each extend along the axis" in one or more claims.

Next in the manufacturing method, the slot members 2 are inserted into the respective through-holes 12 of the iron core 1, as shown in FIG. 3. This step corresponds to a step of "inserting the slot members into the respective through-holes of the iron core" in one or more claims.

Figure 6A:
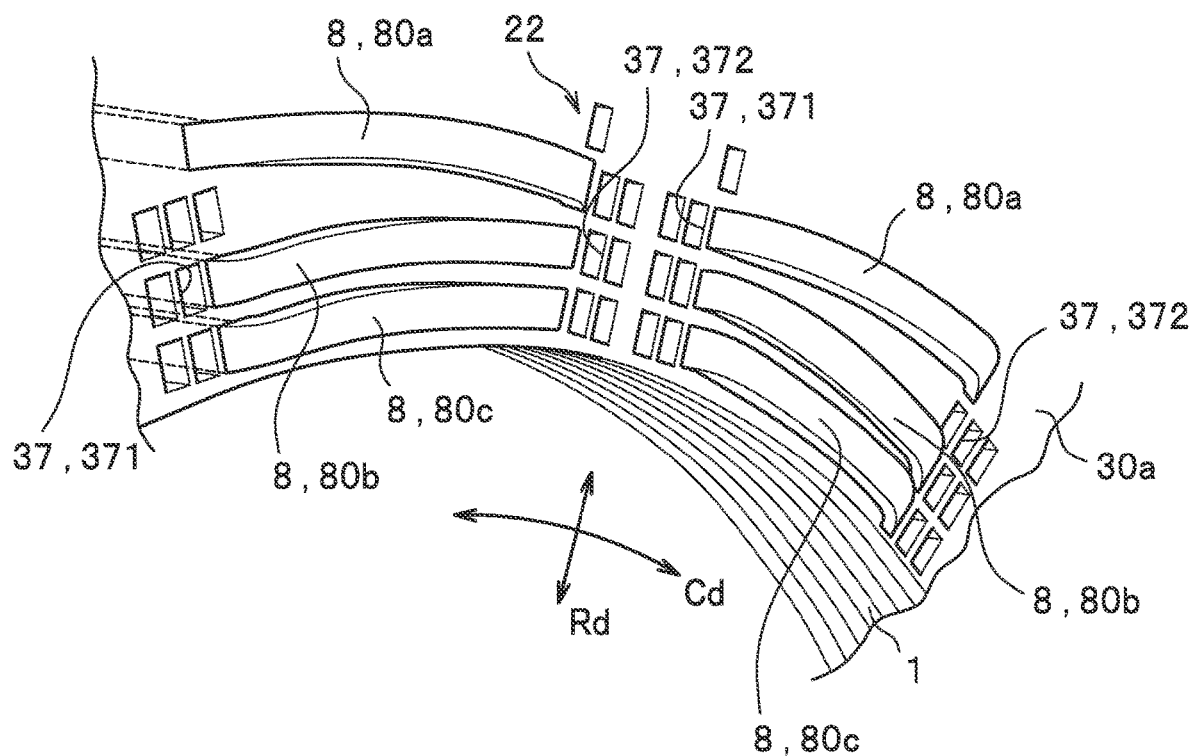
FIG. 6A is a partial enlarged perspective view of a lower face of the iron core to illustrate a step of mounting a winding on the iron core.
Figure 6B:
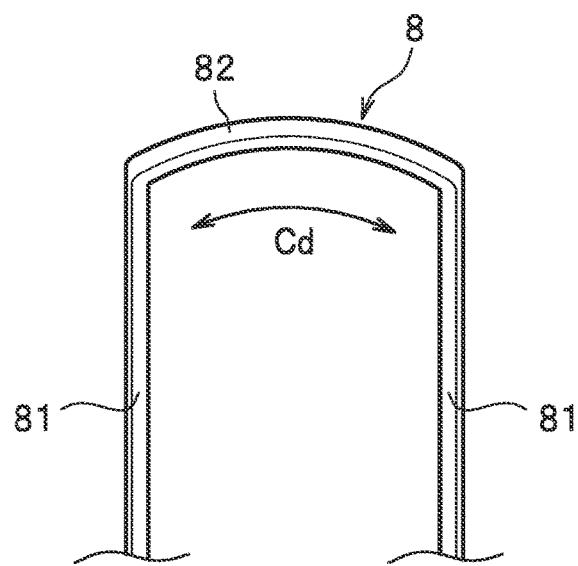
FIG. 6B is a partial enlarged perspective view of the winding made in a U-shape.

Next in the manufacturing method, the first end-face plate 30a is superimposed onto the lower end face 7 of the iron core 1, as shown in FIG. 2. Then, the winding 8 is arranged so as to be wound around the iron core 1 via the first end-face plate 30a and the slot member 2. FIG. 6A illustrates a step of mounting the winding 8 on the iron core 1 via the first end-face plate 30a (see FIG. 2) and the slot member 2 (see FIG. 2), to show a lower face of the first end-face plate 30a, as viewed from the arrowed direction V1 in FIG. 2. FIG. 6B is a partial enlarged perspective view of the winding 8 made in a U-shape. In FIG. 6A, the reference sign 30a indicates the first end-face plate, and the reference sign 1 indicates the iron core. The reference sign 8 indicates the winding, to show a closed side of the winding 8 in a U-shape extending on the lower face of the first end-face plate 30a.

In a step of arranging the winding 8, the winding 8 in a straight shape is bent to make the winding in a U-shape. A number of the windings 8 in a U-shape are prepared according to the number of turns around portions of the iron core between the adjacent slot members 2 (see FIG. 3) in the circumferential direction of the iron core 1 (see FIG. 3). Incidentally, the number of turns per pole is assumed to be nine in the present embodiment. That is, the number of turns corresponds to the nine slots 21 per single slot group 22 from the first row 25d to the third row 25f, as can be seen in FIG. 4B. Accordingly, the number of turns can be adjusted by increasing or decreasing the number of the slots 21 in the slot member 2.

The winding 8 made in a U-shape is described first. The winding 8 in a U-shape prior to being mounted on the iron core 1 (see FIG. 3) includes a biforked portion having legs 81 to open and an R-portion 82 connecting the legs 81 with each other, as shown in FIG. 6B.

The legs 81 are each inserted into the slot 21 (see FIG. 2) via the end-face plate 30 (see FIG. 2), and are formed straight. The R-portion 82 remains on the end-face plate 30 (see FIG. 2) when the legs 81 are inserted into the slots 21 (see FIG. 2) via the end-face plate 30 (see FIG. 2), and is formed flat in a lateral view so as to extend along the end-face plate 30 (see FIG. 2). However, the R-portion 82 is curved to follow a face of the end-face plate 30 (see FIG. 2) in a planar view. Specifically, the R-portion 82 is curved so as to extend along the circumferential direction of the end-face plate 30, that is, the circumferential direction Cd of the iron core 1 (see FIG. 6A).

In the step of mounting the winding 8, the winding 8 in a U-shape has a closed side stayed on a lower face of the first end-face plate 30a (or one end of the slot) and the remaining of the winding inserted into the slot 21 (see FIG. 2).

The first end-face plate 30a is formed with the holes 37 to correspond to the slots 21 (see FIG. 2) of the slot member 2 (see FIG. 2) inserted into the iron core 1, as shown in FIG. 6A. Note that a reference sign 371 in FIG. 6A indicates a hole of the first slot group 23 of the slot member 2 in FIG. 4A, and a reference sign 372 indicates a hole of the second slot group 24 of the slot member 2 in FIG. 4A.

When the open side of the winding 8 in a U-shape, that is, the biforked legs are each inserted into one of the slots 21 of either the first slot group 23 or second slot group 24 of the slot member 2 in FIG. 4B, one of the biforked legs is inserted into the hole 371 in FIG. 6A and the other thereof is inserted into the hole 372 in FIG. 6A. That is, the winding 8 is arranged to straddle over a part of the iron core 1 between the adjacent slot members 2, as shown in FIG. 3.

Specifically, in an example shown in FIG. 6A, a winding 80a of the winding 8 in a U-shape is arranged to straddle the slot 21 (see FIG. 4A) at an intersection of the first column 25a and the fourth row 25g of one of the adjacent slot members 2 and the slot 21 (see FIG. 4A) at an intersection of the first column 25a and the third row 25f of the other of the adjacent slot members 2, in association with the slot member 2 in FIG. 4A.

In addition, a winding 80b of the winding 8 in a U-shape is arranged to straddle the slot 21 (see FIG. 4A) at an intersection of the first column 25a and the second row 25e of one of the adjacent slot members 2 and the slot 21 (see FIG. 4A) at an intersection of the first column 25a and the second row 25e of the other of the adjacent slot members 2, in association with the slot member 2 in FIG. 4A.

Further, a winding 80c of the winding 8 in a U-shape is arranged to straddle the slot 21 (see FIG. 4A) at an intersection of the first column 25a and the first row 25d of one of the adjacent slot members 2 and the slot 21 (see FIG. 4A) at an intersection of the first column 25a and the first row 25d of the other of the adjacent slot members 2, in association with the slot member 2 in FIG. 4A.

Furthermore, in an example shown in FIG. 6A, the windings 80a, 80b, 80c are respectively arranged to straddle the slots 21 in the first columns 25a of the twelve slot members 2 aligned in the circumferential direction Cd, in a manner as described above.

Next, the first end-face plate 30a is superimposed on the lower face thereof with the second end-face plate 30b, as shown in FIG. 2. At this time, the closed side of a U-shape of the winding 8 shown in FIG. 6A, extending along the lower face of the first end-face plate 31a, is fitted into the groove 38 of the second end-face plate 30b in FIG. 5B. Incidentally, a width of the groove 38 in the present embodiment is slightly (by 50 µm, for example) smaller than that of the winding 8. This allows the winding 8 to be fitted into and supported by the groove 38, with light press-fitting action when the first end-face plate 30a is superimposed with the second end-face plate 30b.

Next, the legs 81 of the windings 8 are inserted into the holes 37a, shown in FIG. 5B, of the holes 37 formed in the second end-face plate 30b, to have the windings (not shown) extending on the lower face of the second end-face plate 30b in directions along the grooves 38 shown in FIG. 5C. Then, after the windings (not shown) are arranged as described above for the twelve slot members 2 aligned in the circumferential direction Cd, the second end-face plate 30b is superimposed on the lower face thereof with the third end-face plate 30c, as shown in FIG. 2. At this time, portions of the winding, extending along the lower face of the second end-face plate 31b, are fitted into the grooves 38 of the third end-face plate 30c.

Next, the legs 81 of the windings 8 are inserted into the holes 37a, shown in FIG. 5C, of the holes 37 formed in the third end-face plate 30c, to have the windings (not shown) extending on the lower face of the third end-face plate 30c in directions along the grooves 38 shown in FIG. 5D. Then, after the windings (not shown) are arranged as described above for the twelve slot members 2 aligned in the circumferential direction Cd, the third end-face plate 30c is superimposed on the lower face thereof with the fourth end-face plate 30d. At this time, portions of the winding, extending along the lower face of the third end-face plate 31c, are fitted into the grooves 38 of the fourth end-face plate 30d.

These steps allow the windings 8 extending out of the lower end face 7 of the iron core 1 to be tightly supported by the four-layered end-face plate 30 composed of the first end-face plate 30a to fourth end-face plate 30d, and provide superior electrical insulation properties. Note that the slot member 2 of the present embodiment in FIG. 4A is formed such that halves of the slot 21 abut each other to form the single slot 21 when the parts 2a, 2b, 2c, 2d, and 2e face each other. The slot member 2 having such a structure may have a wedge or the like inserted between the through-hole 12 (see FIG. 3) and the slot member 2 (see FIG. 3) so as to be compressed in the radial direction Rd, for example, to fix the windings 8 inserted into the slot 21 more tightly.

With the manufacturing method as described above, the windings 8 (legs 81 shown in FIG. 6B) inserted from the lower end face 7 (see FIG. 2) of the iron core 1 extend out of the upper end face 7 (see FIG. 2) of the iron core 1, although not shown. Next in the manufacturing method, the fifth end-face plate 30e is superimposed on the upper end face 7 of the iron core 1, as shown in FIG. 2.

Figure 7:
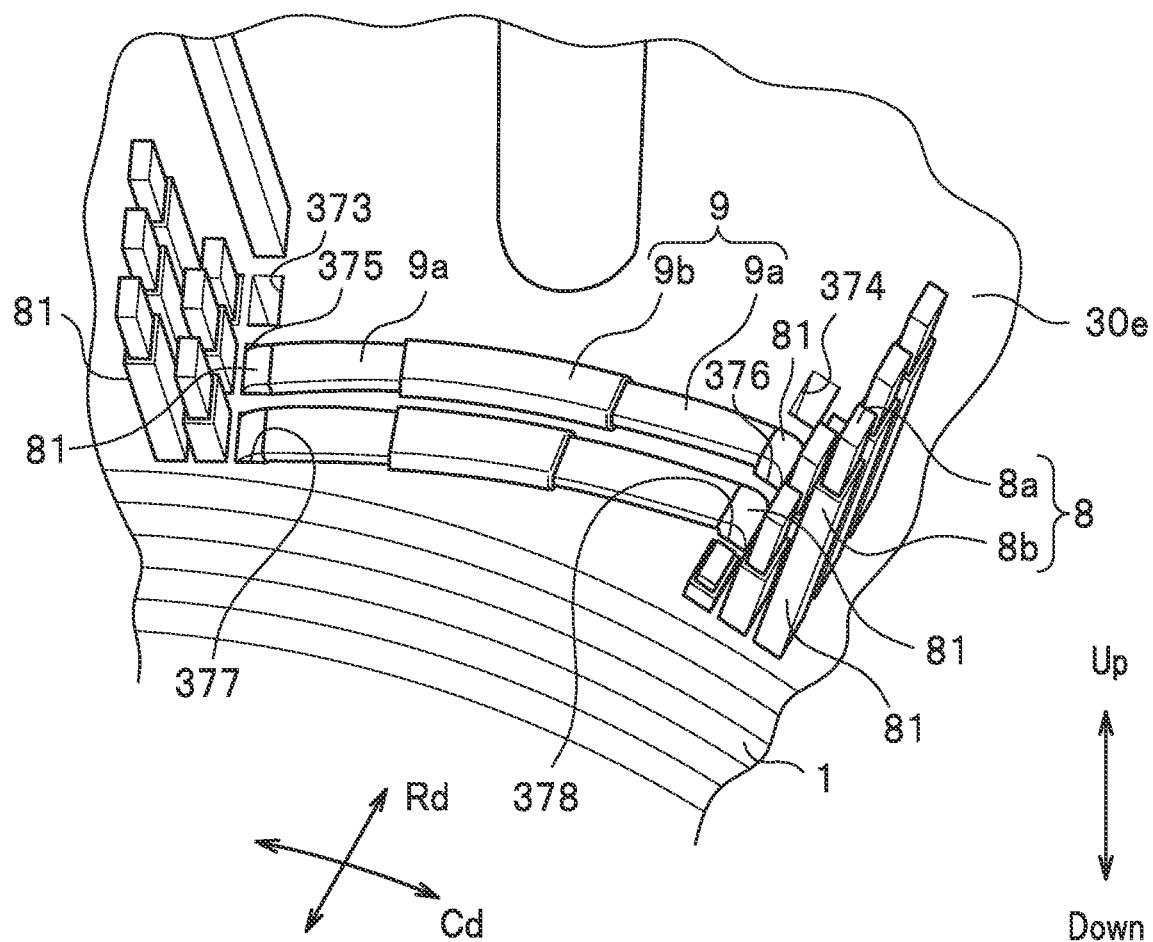
FIG. 7 is a partial enlarged perspective view of an upper face of the iron core to illustrate a step of mounting the winding on the iron core.

FIG. 7 illustrates a step of mounting the winding 8 on the iron core 1 via the fifth end-face plate 30e (see FIG. 2) and the slot member 2 (see FIG. 2), to show the fifth end-face plate 30e as viewed from the arrowed direction V2 in FIG. 2. As shown in FIG. 7, the fifth end-face plate 30e is superimposed on the iron core 1 to have the windings 8 (legs 81 shown in FIG. 6B) extending out of the holes 37, except a hole 373 and a hole 374. That is, ends of the open (or biforked) side of the winding 8 extend out of "the other end of the slot" in one or more claims. The hole 373 corresponds to the slot 21 (see FIG. 4B) of one of the adjacent slot members 2 at an intersection of the first column 25a and the third row 25f, in association with the slot member 2 in FIG. 4A. Likewise, the hole 374 corresponds to the slot 21 (see FIG. 4B) of the other of the adjacent slot members 2 (see FIG. 3) at an intersection of the first column 25a and the fourth row 25g.

Next, the legs 81 (see FIG. 6B) of the winding 8 extending out of the hole 37b (see FIG. 5A) of the fifth end-face plate 30e (see FIG. 5A) are connected by the bridge lines 9 extending along the grooves 38 shown in FIG. 5E. Specifically, the leg 81 extending out of a hole 375 of the fifth end-face plate 30e is connected by the bridge line 9 with the leg 81 extending out of a hole 376 of said plate, as shown in FIG. 7. In addition, the leg 81 extending out of a hole 377 of the fifth end-face plate 30e is connected by the bridge line 9 with the leg 81 extending out of a hole 378 of said plate.

The hole 375 corresponds to the slot 21 (see FIG. 4B) of one of the adjacent slot members 2 at an intersection of the first column 25*a* and the second row 25*e,* in association with the slot member 2 in FIG. 4A. The hole 376 corresponds to the slot 21 (see FIG. 4B) of the other of the adjacent slot members 2 (see FIG. 3) at an intersection of the first column 25*a* and the third row 25*f.* The hole 377 corresponds to the slot 21 (see FIG. 4B) of said one of the adjacent slot members 2 at an intersection of the first column 25*a* and the first row 25*d.* The hole 378 corresponds to the slot 21 (see FIG. 4B) of said the other of the adjacent slot members 2 (see FIG. 3) at an intersection of the first column 25*a* and the second row 25*e.*

The bridge lines 9 connect the legs 81 with each other and are aggregated into the windings 8. The bridge line 9 is curved so as to be convex outward in the radial direction Rd, as with the R-portion 82 of the winding 8 in a U-shape shown in FIG. 4B.

Incidentally, the winding 8 in a U-shape and bridge line 9 of the present embodiment include wires 8*a,* 9*a* as core material and covering material 8*b,* 9*b* made of thermoplastic resin to cover the wires 8*a,* 9*a,* respectively, as shown in FIG. 7. The winding 8 and bridge line 9 each have a cross section in a rectangular shape so as to follow that of the slot 21 of the slot member 2 shown in FIG. 4A. The leg 81 of the winding 8 in a U-shape is connected with the bridge line 9 at portions of the wires 8*a,* 9*a* having the covering material 8*b,* 9*b* partly removed.

The connection of the windings 8 in a U-shape by the bridge lines 9, as described above, is made on the fifth end-face plate 30*e* (see FIG. 5A) similarly for the twelve slot members 2 aligned in the circumferential direction Cd. Then, the fifth end-face plate 30*e* is superimposed on the upper face thereof with the sixth end-face plate 30*f,* as shown in FIG. 2. At this time, the bridge lines 9, extending on the fifth end-face plate 30*e* (see FIG. 5A), are fitted into the grooves 38 of the sixth end-face plate 30*f* shown in FIG. 5E, with light press-fitting action. Although not shown, the other legs 81 (see FIG. 7) of the windings 8, which are not connected by the bridge lines 9 (see FIG. 7), run through the holes 37 shown in FIG. 5E, which are formed at positions corresponding to said legs, and extend upward.

Next in the manufacturing method, the bridge lines (not shown) are arranged such that the legs 81 (see FIG. 7) of the windings 8, running through the holes 37*a* shown in FIG. 5E and extending upward, of those running through the holes 37 shown in FIG. 5E and extending upward are connected with each other to extend along the grooves 38 shown in FIG. 5F. The connection of the windings (not shown) in a U-shape by the bridge lines (not shown), as described above, is made on the sixth end-face plate 30*f* (see FIG. 5E) similarly for the twelve slot members 2 aligned in the circumferential direction Cd. Then, the sixth end-face plate 30*f* is superimposed on the upper face thereof with the seventh end-face plate 30*g,* as shown in FIG. 2. At this time, the bridge lines (not shown), extending on the sixth end-face plate 30*f* (see FIG. 5E), are fitted into the grooves 38 of the seventh end-face plate 30*g* shown in FIG. 5F, with light press-fitting action. The other legs (not shown) of the windings, which are not connected by the bridge lines (not shown), run through the holes 37 shown in FIG. 5F, which are formed at positions corresponding to said legs, and extend upward.

Next in the manufacturing method, the bridge lines (not shown) are arranged such that the legs (not shown) of the windings, running through the holes 37*a* shown in FIG. 5F and extending upward, of those running through the holes 37 shown in FIG. 5F and extending upward are connected with each other to extend along the grooves 38 shown in FIG. 5G. The connection of the windings (not shown) in a U-shape by the bridge lines (not shown), as described above, is made on the seventh end-face plate 30*f* (see FIG. 5F) similarly for the twelve slot members 2 aligned in the circumferential direction Cd. Then, the seventh end-face plate 30*g* is superimposed on the upper face thereof with the eighth end-face plate 30*h,* as shown in FIG. 2. At this time, the bridge lines (not shown), extending on the seventh end-face plate 30*g* (see FIG. 5F), are fitted into the grooves 38 of the eighth end-face plate 30*h* shown in FIG. 5G, with light press-fitting action. The other legs (not shown) of the windings, which are not connected by the bridge lines (not shown), run through the holes 37 shown in FIG. 5G, which are formed at positions corresponding to said legs, and extend upward.

Next in the manufacturing method, the bridge lines (not shown) are arranged such that the legs (not shown) of the windings, running through the holes 37*a* shown in FIG. 5G and extending upward, of those running through the holes 37 shown in FIG. 5G and extending upward are connected with each other to extend along the grooves 38 shown in FIG. 5H. The connection of the windings (not shown) in a U-shape by the bridge lines (not shown), as described above, is made on the eighth end-face plate 30*g* (see FIG. 5G) similarly for the twelve slot members 2 aligned in the circumferential direction Cd. Then, the eighth end-face plate 30*h* is superimposed on the upper face thereof with the ninth end-face plate 30*i,* as shown in FIG. 2. At this time, the bridge lines (not shown), extending on the eighth end-face plate 30*h* (see FIG. 5G), are fitted into the grooves 38 of the ninth end-face plate 30*i* shown in FIG. 5H, with light press-fitting action. The other legs (not shown) of the windings, which are not connected by the bridge lines (not shown), run through the holes 37 shown in FIG. 5H, which are formed at positions corresponding to said legs, and extend upward.

Next in the manufacturing method, the bridge lines (not shown) are arranged such that the legs (not shown) of the windings, running through the holes 37*a* shown in FIG. 5H and extending upward, of those running through the holes 37 shown in FIG. 5H and extending upward are connected with each other to extend along the grooves 38 shown in FIG. 5I. The connection of the windings (not shown) in a U-shape by the bridge lines (not shown), as described above, is made on the ninth end-face plate 30*i* (see FIG. 5H) similarly for the twelve slot members 2 aligned in the circumferential direction Cd. Then, the ninth end-face plate 30*i* is superimposed on the upper face thereof with the tenth end-face plate 30*j,* as shown in FIG. 2. At this time, the bridge lines (not shown), extending on the ninth end-face plate 30*i* (see FIG. 5H), are fitted into the grooves 38 of the tenth end-face plate 30*j* shown in FIG. 5I, with light press-fitting action. The other legs (not shown) of the windings, which are not connected by the bridge lines (not shown), run through four holes 37*a*1, 37*a*2, 37*a*3, 37*a*4 shown in FIG. 5I, which are formed at positions corresponding to said legs, and extend upward.

In the manufacturing method, the nine windings 8 in a U-shape (see FIG. 6B) to form nine turns per pole, as described above, are aggregately coupled by the bridge lines 9 (see FIG. 7) so as to be wound around the iron core in a predetermined direction. Specifically, assuming that a winding (not shown) has a base end for the hole 37*a*1 in FIG. 5I, to be connected to a lead line (not shown) extending along the groove 38*a* in FIG. 5J, and a front end for the hole 37*a*2, the winding is wound counterclockwise around the iron core, as laterally viewed outward from an inner side in the radial direction of the iron core 1 (see FIG. 3).

In addition, a winding (not shown) for the hole 37*a*2 in FIG. 5I is connected to a winding (not shown) for the hole 37a3 in FIG. 5I via a lead line extending along the groove 38b in FIG. 5J. Assuming that a winding (not shown) has a base end for the hole 37a3 in FIG. 5I and a front end for the hole 37a4 in FIG. 5I, the winding is wound clockwise around the iron core, as laterally viewed outward from an inner side in the radial direction of the iron core 1 (see FIG. 3).

Further, a winding (not shown) for the hole 37a4 in FIG. 5I is connected to a winding (not shown) as a base end, circumferentially aligned with the hole 37a5 so as to correspond to the hole 37a1, via a lead line extending along the groove 38b in FIG. 5J. The windings 8 respectively wound around 12 poles of the iron core arranged between the twelve slot members 2 are connected by the lead lines (not shown) as described above so as to be aggregately coupled over the entire circumferential direction of the iron core 1. That is, when a high electrical current is applied from a predetermined power source, such as a capacitive power supply, between one end and the other end of the winding 8 aggregately coupled over the entire circumferential direction of the iron core 1, the iron core 1 forms 12 poles alternately having positive and negative (N and S) poles so as to be circumferentially aligned on a radially inner side thereof.

Next in the manufacturing method, the tenth end-face plate 30j is superimposed on an upper face thereof with the eleventh end-face plate 30k. At this time, the bridge lines (not shown), extending on the tenth end-face plate 30j (see FIG. 5G), are fitted into the grooves 38a, 38b, 38c of the eleventh end-face plate 30k shown in FIG. 5J, with light press-fitting action. Then, as shown in FIG. 2, the iron core 1 is integrally joined by the first fastener 6a and second faster 6b with the end-face plates 3, having the cooling pipes 5 inserted into and fixed in the through-holes 13, to complete the magnetizing yoke 100 in FIG. 1.

A description is next given of advantageous effects achieved by the magnetizing yoke 100 of the present embodiment. In the magnetizing yoke 100 of the present embodiment, the windings 8 of the iron core 1 are inserted into and fixed to the pre-molded slot members 2 made of thermoplastic resin. According to the magnetizing yoke 100 as described above, the resin material for fixing the windings 8 (i.e. the slot members 2) are free from voids, unlike a conventional magnetizing yoke (see Patent Document 1, for example) using a resin material made of thermoplastic resin to fix windings. This allows the magnetizing yoke 100 of the present embodiment to prevent coils (windings 8) from being damaged and/or broken when an object to be magnetized is magnetized, more securely as compared with any conventional arts.

In addition, the iron core 1 of the magnetizing yoke 100 of the present embodiment is superimposed on the end faces thereof with the end-face plates 30 made of thermoplastic resin. According to the magnetizing yoke 100 as described above, the resin material for fixing the windings 8 on the end faces of the iron core 1 (i.e., the end-face plates 30) are free from voids, unlike a conventional magnetizing yoke (see Patent Document 1, for example) using a resin material made of thermosetting resin to fix coil ends of the windings. This allows the magnetizing yoke 100 of the present embodiment to prevent coils (windings 8) from being damaged and/or broken when an object to be magnetized is magnetized, more securely as compared with any conventional arts.

Further, the magnetizing yoke 100 of the present embodiment is formed, on the end-face plates 30 thereof, with winding supporters (holes 37 and grooves 38) to support the windings 8 extending out of the slots 21. According to the magnetizing yoke 100 as described above, the windings 8 extending out of the end faces of the iron core 1 are more securely fixed.

Still further, the thermoplastic resin to form the slot members 2 and the like of the magnetizing yoke 100 of the present embodiment is crystalline resin. According to the magnetizing yoke 100 as described above, the resin material of the slot members 2 and the like provides more superior heat resistance properties, mechanical strength, workability, and the like.

Still further, the manufacturing method of the magnetizing yoke 100 according to the present embodiment requires no defoaming step for the resin material (slot members 2) to fix the coils (windings 8), unlike the conventional manufacturing method of a magnetizing yoke (see Patent Document 1, for example), and uses a simple step of mounting the slot members 2 made of resin on the iron core 1 to manufacture the magnetizing yoke 100 capable of more securely preventing the coils (windings 8) from being damaged and/or broken.

Still further, with the manufacturing method of the magnetizing yoke 100 according to the present embodiment, the windings 8 covered by the covering material made of thermoplastic resin are inserted into the slot members 2 made of thermoplastic resin to have the windings 8 wound around the iron core 1. According to the manufacturing method as described above, when a large alternate load is applied to the windings 8 due to a high electrical current applied thereto, the slot members 2 made of thermoplastic resin and the covering material made of thermoplastic resin provide strong forces to fix the windings 8 to the iron core 1 and further improve electrical insulation properties.

Still further, with the manufacturing method as described above, a number of sets of the windings 8 in a U-shape are connected with each other to form a structure of the windings 8 wound around the iron core 1 and therefore there is no need of separately preparing a device for winding the windings 8 (coils). Additionally, a structure to be wound by a winding device has a limitation in diameter of the winding 8, but the manufacturing method as described above causes a number of sets of the windings 8 in a U-shape to be connected with each other to form a structure of the windings 8 wound around the iron core 1, to allow for increasing a stress area of the winding 8.

Figure 8:
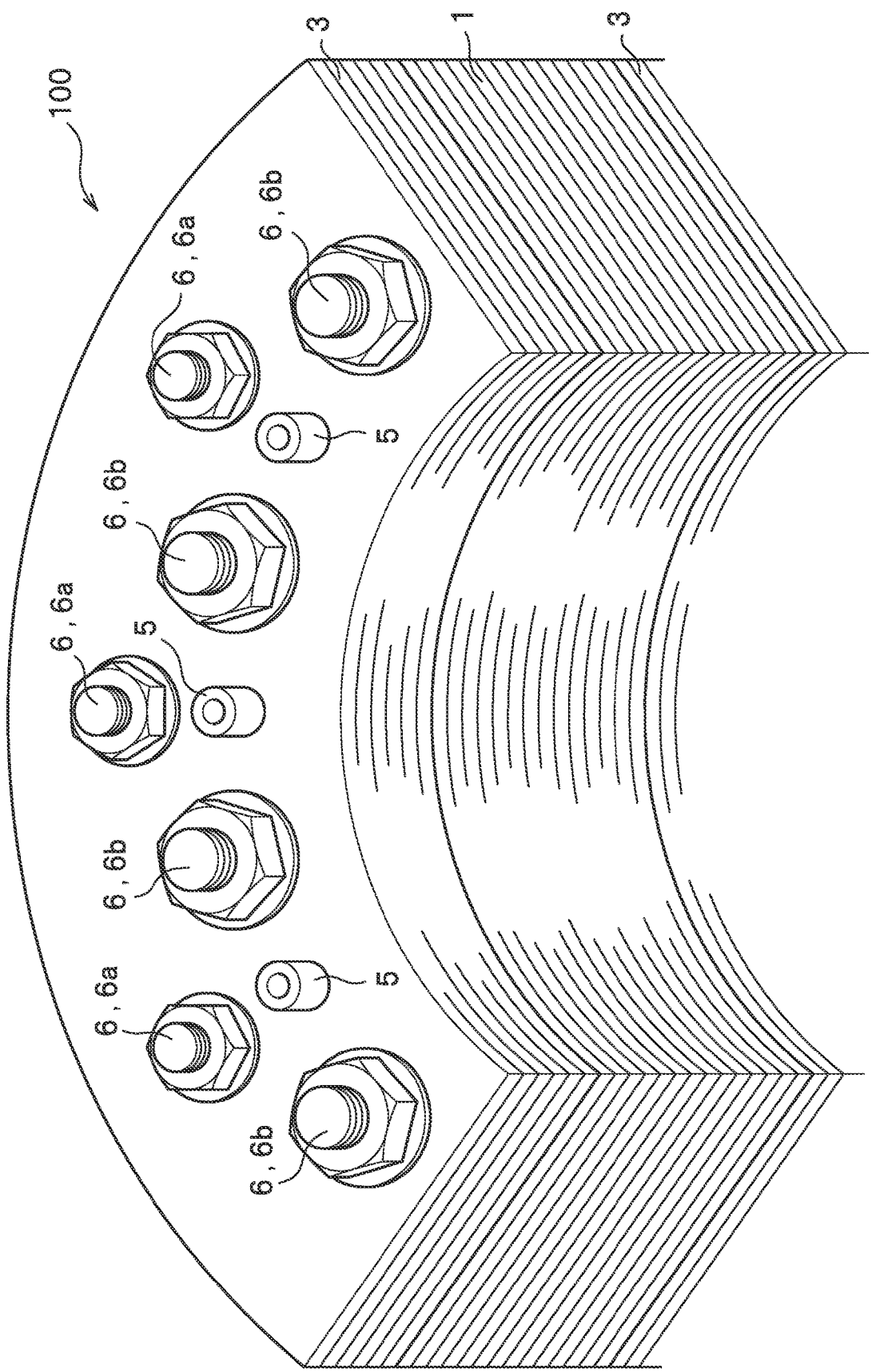
FIG. 8 illustrates a configuration of a magnetizing yoke according to a first modification.
Figure 9:
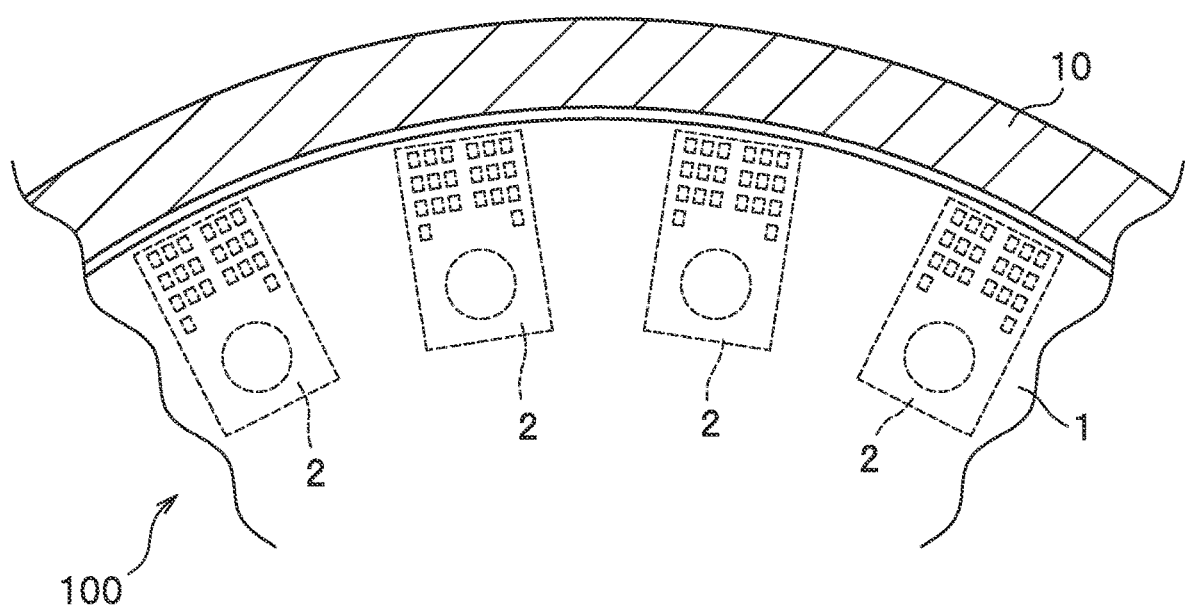
FIG. 9 illustrates a configuration of a magnetizing yoke according to a second modification.
Figure 10:
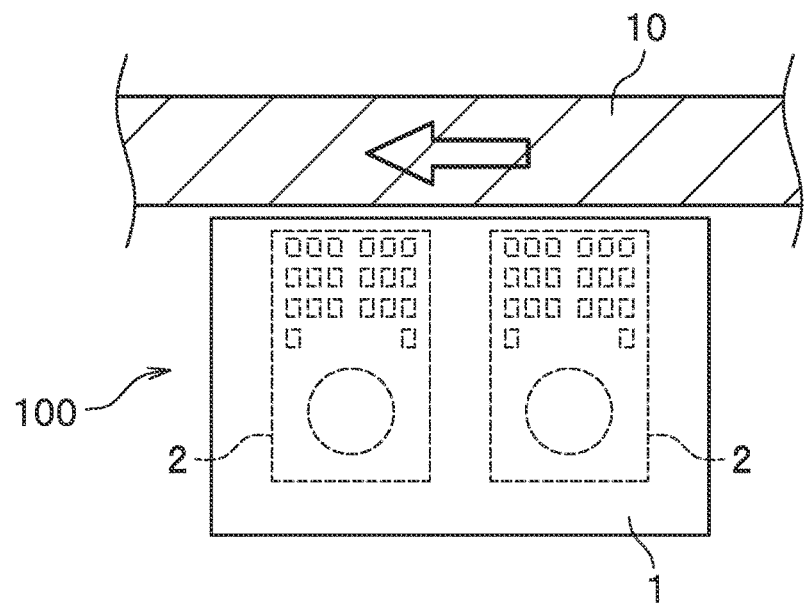
FIG. 10 illustrates a configuration of a magnetizing yoke according to a third modification.

Hereinabove, the present embodiment has been described, but the present invention is not limited thereto, and various embodiments may be implemented. FIG. 8 illustrates a configuration of the magnetizing yoke 100 according to a first modification. FIG. 9 illustrates a configuration of the magnetizing yoke 100 according to a second modification. FIG. 10 illustrates a configuration of the magnetizing yoke 100 according to a third modification. Note that the same components as those in the present embodiment are denoted by the same reference signs in FIGS. 8 to 10, and duplicate descriptions thereof are omitted. Descriptions of the windings inserted into the slot members 2 are also omitted in FIGS. 8 to 10 for the purpose of illustration.

The magnetizing yoke 100 according to the first modification has a fan shape in a planar view, as shown in FIG. 8. The magnetizing yoke 100 according to the first modification is assumed to have one or 2n (n is a natural number) poles, although not shown. In the magnetizing yoke 100 as described above, an object to be magnetized (not shown) placed on a radially inner side of the yoke is magnetized over the entire peripheral surface of the object while being rotated. Note that the magnetizing yoke 100 having one pole executes a switching step of alternating positive and negative polarities of an electrical current applied to power terminals (not shown) for every magnetization.

The magnetizing yoke 100 according to the second modification has a cylindrical shape, as shown in FIG. 9, although partially shown for the purpose of illustration. The magnetizing yoke 100 has the slot members 2 aligned in the circumferential direction at equal intervals along outer peripheral surfaces of the yoke. Poles of the magnetizing yoke 100 are formed so as to circumferentially alternate at portions of the iron core between the adjacent slot members 2. The magnetizing yoke 100 as described above circumferentially magnetizes a radially inner peripheral surface of an object 10 in a ring shape to be magnetized. Note that the magnetizing yoke in FIG. 9 may be modified to have a fan shape in a planar view, but the object 10 to be magnetized is rotated in this case about an axis of the iron core (not shown), although not shown, to magnetize a radially inner peripheral surface of an object to be magnetized over the entire circumferential direction.

The magnetizing yoke 100 according to the third modification has a rectangular shape in a planar view, as shown in FIG. 10. The magnetizing yoke 100 as described above is assumed to magnetize the object 10 in a belt shape, linearly extending in one direction. The magnetizing yoke 100 as described above has a number of the slot members 2 arranged on a side thereof facing the object 10 to be magnetized, along an extending direction of the object 10. An outlined arrow in FIG. 10 indicates a direction in which the object 10 moves for every magnetization. Note that the magnetizing yoke 100 according to the third modification is assumed to have one pole. The magnetizing yoke 100 as described above executes a switching step of alternating positive and negative polarities of an electrical current applied to the power terminals (not shown) for every magnetization of the object 10. This makes the object 10 to be magnetized such that the polarity (N and S) alternates in a longitudinal direction thereof.

LIST OF REFERENCE SIGNS

1: iron core, 2: slot member, 3: end-face member, 7: end face of iron core, 8: winding, 8a: wire, 8b: covering material, 12: through-hole of iron core, 21: slot, 30: end-face plate, 30a: first end-face plate (end-face plate), 30b: second end-face plate (end-face plate), 30c: third end-face plate (end-face plate), 30d: fourth end-face plate (end-face plate), 30e: fifth end-face plate (end-face plate) , 30f: sixth end-face plate (end-face plate), 30g: seventh end-face plate (end-face plate), 30h: eighth end-face plate (end-face plate), 30i: ninth end-face plate (end-face plate), 30j: tenth end-face plate (end-face plate), 30k: eleventh end-face plate (end-face plate), 37: hole in end-face plate (winding supporter), 38: groove in end-face plate (winding supporter), 100: magnetizing yoke, and Ax: axis of iron core.

What is claimed is:

1. A magnetizing yoke comprising:
    an iron core having through-holes arranged side by side in a circumferential direction about an axis of the iron core, so that the through-holes each extend along the axis;
    slot members each made of thermoplastic resin and formed with slots for inserting and fixing windings of the iron core,
    wherein the slot members are inserted into the through-holes, respectively,
    the iron core is superimposed on end faces thereof with end-face plates made of thermoplastic resin, and
    the end faces each have two or more of the end-face plates superimposed thereon in an axial direction of the iron core, with adjacent two of the end-face plates being axially in tight contact with each other.

2. The magnetizing yoke as claimed in claim 1, wherein the end-face plates are formed with winding supporters to support the windings extending out of the slots.

3. The magnetizing yoke as claimed in claim 1, wherein the thermoplastic resin is crystalline resin.

4. A manufacturing method of a magnetizing yoke comprising:
    a step of arranging through-holes in an iron core side by side in a circumferential direction about an axis of the iron core, so that the through-holes each extend along the axis;
    a step of forming slot members each made of thermoplastic resin and formed with slots for inserting and fixing windings of the iron core;
    a step of inserting the slot members into the respective through-holes;
    a step of inserting the windings into the slots for fixing; and
    a step of superimposing end-face plates made of thermoplastic resin on end faces of the iron core, wherein
    the end faces each have two or more of the end-face plates superimposed thereon in an axial direction of the iron core, with adjacent two of the end-face plates being axially in tight contact with each other.

5. The manufacturing method of a magnetizing yoke as claimed in claim 4,
    wherein the windings each include covering material made of thermoplastic resin to cover a wire as core material, and
    the step of inserting the windings into the slots includes:
    a step of preparing a number of sets of the windings bent in a U-shape to have a biforked form, according to the number of turns around the iron core;
    a step of arranging one of a number of sets of the prepared windings, so as to straddle over a part of the iron core between the adjacent slot members, by inserting one end of the biforked form into one end of one of the slots in one of the adjacent slot members and inserting the other end of the biforked form into one end of one of the slots in the other of the adjacent slot members;
    a step of repeating the step of arranging one of a number of the prepared windings, according to the number of turns around the iron core;
    a step of partly removing the covering material at each end of the windings extending out of the other end of each of the slots; and
    a step of joining a number of sets of the windings in a U-shape with each other at portions thereof having the covering material partly removed so as to have the number of turns around the iron core.

* * * * *